(12) United States Patent
Scheinert et al.

(10) Patent No.: US 7,817,958 B2
(45) Date of Patent: Oct. 19, 2010

(54) SYSTEM FOR AND METHOD OF PROVIDING REMOTE COVERAGE AREA FOR WIRELESS COMMUNICATIONS

(75) Inventors: Stefan Scheinert, San Jose, CA (US); Ian Sugarbroad, San Carlos, CA (US)

(73) Assignee: LGC Wireless Inc., San Jose, CA (US)

( * ) Notice: Subject to any disclaimer, the term of this patent is extended or adjusted under 35 U.S.C. 154(b) by 837 days.

(21) Appl. No.: 11/644,034

(22) Filed: Dec. 22, 2006

(65) Prior Publication Data

US 2008/0151846 A1 Jun. 26, 2008

(51) Int. Cl.
*H04H 1/00* (2006.01)
(52) U.S. Cl. ............... 455/3.01; 455/11.1; 455/142; 455/552.1; 370/279; 375/211
(58) Field of Classification Search ............... 455/3.01, 455/3.02, 3.06, 12.1, 456.6, 11.1, 41.2, 552.1, 455/556.1, 131, 449, 450, 444, 446, 443, 455/101, 452, 434, 67.1, 226.1, 226.2, 280, 455/432.2, 93, 130, 142, 554.1; 370/338, 370/342, 279, 293; 375/221
See application file for complete search history.

(56) References Cited

U.S. PATENT DOCUMENTS

| 3,866,121 A | * | 2/1975 | Nakamura et al. ............ 455/10 |
| 4,183,054 A | | 1/1980 | Patisaul et al. |
| 4,451,916 A | | 5/1984 | Casper et al. |
| 4,611,323 A | | 9/1986 | Hessenmuller |
| 4,628,501 A | | 12/1986 | Loscoe |
| 4,654,843 A | | 3/1987 | Roza et al. |
| 4,667,319 A | | 5/1987 | Chum |
| 4,691,292 A | | 9/1987 | Rothweiler |

(Continued)

FOREIGN PATENT DOCUMENTS

DE 3707244 A 9/1988

(Continued)

OTHER PUBLICATIONS

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.

(Continued)

*Primary Examiner*—Tan Trinh
(74) *Attorney, Agent, or Firm*—Fogg & Powers LLC

(57) ABSTRACT

The present invention is a system for and a method of providing one or more remote coverage areas for wireless communications. In an embodiment, a system for providing a remote coverage area for wireless communications comprises a local system that generates a first radio communication signal and a remote system located geographically remote from the local system. The remote system comprises a first converter that converts the first radio communication signal to a stream of data packets, a network that receives the stream of data packets from the first converter; and a second converter that receives the stream of data packets from the network and generates the remote coverage area by converting the stream of data packets to a second radio communication signal. The remote coverage area may be located indoors.

26 Claims, 12 Drawing Sheets

U.S. PATENT DOCUMENTS

| | | | |
|---|---|---|---|
| 4,760,573 A | 7/1988 | Calvignac et al. | |
| 4,789,993 A * | 12/1988 | Ryu | 375/214 |
| 4,999,831 A | 3/1991 | Grace | |
| 5,193,109 A | 3/1993 | Chien-Yeh Lee | |
| 5,212,831 A | 5/1993 | Chuang et al. | |
| 5,243,598 A | 9/1993 | Lee | |
| 5,303,287 A | 4/1994 | Laborde | |
| 5,321,736 A | 6/1994 | Beasley | |
| 5,321,849 A | 6/1994 | Lemson | |
| 5,339,184 A | 8/1994 | Tang | |
| 5,351,146 A | 9/1994 | Chan et al. | |
| 5,381,459 A | 1/1995 | Lappington | |
| 5,400,391 A | 3/1995 | Emura et al. | |
| 5,461,627 A | 10/1995 | Rypinski | |
| 5,519,691 A | 5/1996 | Darcie et al. | |
| 5,545,397 A | 8/1996 | Spielvogel et al. | |
| 5,563,606 A | 10/1996 | Wang | |
| 5,566,168 A | 10/1996 | Dent | |
| 5,603,080 A | 2/1997 | Kallander et al. | |
| 5,621,786 A | 4/1997 | Fischer et al. | |
| 5,627,879 A | 5/1997 | Russell et al. | |
| 5,631,916 A | 5/1997 | Georges et al. | |
| 5,642,405 A | 6/1997 | Fischer et al. | |
| 5,644,622 A | 7/1997 | Russell et al. | |
| 5,657,374 A | 8/1997 | Russell et al. | |
| 5,668,562 A | 9/1997 | Cutrer et al. | |
| 5,682,256 A | 10/1997 | Motley et al. | |
| 5,701,583 A | 12/1997 | Harbin et al. | |
| 5,708,961 A | 1/1998 | Hylton et al. | |
| 5,732,076 A | 3/1998 | Ketseoglou et al. | |
| 5,761,619 A | 6/1998 | Danne et al. | |
| 5,765,097 A | 6/1998 | Dail | |
| 5,765,099 A | 6/1998 | Georges et al. | |
| 5,774,789 A * | 6/1998 | van der Kaay et al. | 455/16 |
| 5,781,541 A | 7/1998 | Schneider | |
| 5,781,859 A | 7/1998 | Beasley | |
| 5,787,344 A | 7/1998 | Scheinert | |
| 5,802,173 A | 9/1998 | Hamilton-Piercy et al. | |
| 5,805,983 A | 9/1998 | Naidu et al. | |
| 5,809,395 A | 9/1998 | Hamilton-Piercy et al. | |
| 5,809,419 A | 9/1998 | Schellinger et al. | |
| 5,809,422 A * | 9/1998 | Raleigh et al. | 455/449 |
| 5,815,538 A | 9/1998 | Grell et al. | |
| 5,822,324 A | 10/1998 | Kostresti et al. | |
| 5,833,493 A | 11/1998 | Hung | |
| 5,852,651 A | 12/1998 | Fischer et al. | |
| 5,875,179 A | 2/1999 | Tikalsky | |
| 5,878,325 A | 3/1999 | Dail | |
| 5,883,882 A | 3/1999 | Schwartz | |
| 5,887,261 A | 3/1999 | Csapo et al. | |
| 5,907,544 A | 5/1999 | Rypinski | |
| 5,912,641 A | 6/1999 | Dietrich | |
| 5,930,682 A | 7/1999 | Schwartz et al. | |
| 5,946,622 A | 8/1999 | Bojeryd | |
| 5,969,837 A | 10/1999 | Farber et al. | |
| 5,983,070 A | 11/1999 | Georges et al. | |
| 5,987,014 A | 11/1999 | Magill et al. | |
| 6,005,884 A | 12/1999 | Cook et al. | |
| 6,014,546 A | 1/2000 | Georges et al. | |
| 6,034,950 A | 3/2000 | Sauer et al. | |
| 6,078,812 A | 6/2000 | Mintz | |
| 6,108,113 A | 8/2000 | Fee | |
| 6,108,550 A | 8/2000 | Wiorek et al. | |
| 6,108,626 A | 8/2000 | Cellario et al. | |
| 6,112,086 A | 8/2000 | Wala | |
| 6,125,260 A | 9/2000 | Wiedeman et al. | |
| 6,128,496 A | 10/2000 | Scheinert | |
| 6,147,786 A | 11/2000 | Pan | |
| 6,157,659 A | 12/2000 | Bird | |
| 6,157,810 A | 12/2000 | Georges et al. | |
| 6,181,687 B1 | 1/2001 | Bisdikian | |
| 6,188,693 B1 | 2/2001 | Murakami | |
| 6,188,719 B1 * | 2/2001 | Collomby | 375/211 |
| 6,192,216 B1 | 2/2001 | Sabat, Jr. et al. | |
| 6,195,342 B1 | 2/2001 | Rohani | |
| 6,198,558 B1 | 3/2001 | Graves et al. | |
| 6,222,660 B1 | 4/2001 | Traa | |
| 6,226,274 B1 | 5/2001 | Reese et al. | |
| 6,236,365 B1 | 5/2001 | LeBlanc et al. | |
| 6,249,252 B1 | 6/2001 | Dupray | |
| 6,262,981 B1 | 7/2001 | Schmutz | |
| 6,275,990 B1 | 8/2001 | Dapper et al. | |
| 6,285,881 B1 | 9/2001 | Huang | |
| 6,317,884 B1 | 11/2001 | Eames et al. | |
| 6,337,754 B1 | 1/2002 | Imajo | |
| 6,353,600 B1 | 3/2002 | Schwartz et al. | |
| 6,362,908 B1 | 3/2002 | Kimbrough et al. | |
| 6,373,887 B1 | 4/2002 | Aiyagari et al. | |
| 6,374,124 B1 | 4/2002 | Slabinski | |
| 6,377,640 B2 | 4/2002 | Trans | |
| 6,421,009 B2 | 7/2002 | Suprunov | |
| RE37,820 E | 8/2002 | Scheinert | |
| 6,459,900 B1 | 10/2002 | Scheinert | |
| 6,466,572 B1 | 10/2002 | Ethridge et al. | |
| 6,480,551 B1 | 11/2002 | Ohishi et al. | |
| 6,484,012 B1 | 11/2002 | Nche et al. | |
| 6,486,907 B1 | 11/2002 | Farber et al. | |
| 6,498,936 B1 | 12/2002 | Raith | |
| 6,556,551 B1 | 4/2003 | Schwartz | |
| 6,567,473 B1 | 5/2003 | Tzannes | |
| 6,574,472 B1 * | 6/2003 | Scheinert | 455/434 |
| 6,594,496 B2 | 7/2003 | Schwartz | |
| 6,667,973 B1 | 12/2003 | Gorshe et al. | |
| 6,674,966 B1 | 1/2004 | Koonen | |
| 6,684,058 B1 | 1/2004 | Karacaoglu et al. | |
| 6,697,603 B1 | 2/2004 | Lovinggood et al. | |
| 6,704,545 B1 | 3/2004 | Wala | |
| 6,729,929 B1 * | 5/2004 | Sayers et al. | 455/446 |
| 6,768,745 B1 | 7/2004 | Gorshe et al. | |
| 6,771,933 B1 | 8/2004 | Eng et al. | |
| 6,785,558 B1 | 8/2004 | Stratford et al. | |
| 6,801,767 B1 | 10/2004 | Schwartz et al. | |
| 6,826,163 B2 | 11/2004 | Mani et al. | |
| 6,826,164 B2 | 11/2004 | Mani et al. | |
| 6,831,901 B2 | 12/2004 | Millar | |
| 6,865,390 B2 | 3/2005 | Goss et al. | |
| 6,907,048 B1 | 6/2005 | Treadaway et al. | |
| 6,917,614 B1 | 7/2005 | Laubach et al. | |
| 6,952,181 B2 | 10/2005 | Karr et al. | |
| 6,963,305 B2 * | 11/2005 | Knapp | 342/367 |
| 6,967,966 B1 | 11/2005 | Donohue | |
| 7,014,500 B2 | 3/2006 | Belesimo | |
| 7,016,308 B1 | 3/2006 | Gallagher | |
| 7,035,671 B2 | 4/2006 | Solum | |
| 7,050,786 B2 | 5/2006 | Caci | |
| 7,103,279 B1 | 9/2006 | Koh et al. | |
| 7,127,175 B2 | 10/2006 | Mani et al. | |
| 7,136,624 B2 | 11/2006 | Ofuji et al. | |
| 7,151,940 B2 | 12/2006 | Diao et al. | |
| 7,205,864 B2 | 4/2007 | Schultz, Jr. et al. | |
| 7,215,651 B2 | 5/2007 | Millar | |
| 7,289,972 B2 | 10/2007 | Rieser et al. | |
| 7,313,415 B2 | 12/2007 | Wake et al. | |
| 2002/0037054 A1 | 3/2002 | Schurig | |
| 2002/0049061 A1 * | 4/2002 | Pinola | 455/452 |
| 2002/0072329 A1 | 6/2002 | Bandeira et al. | |
| 2002/0089958 A1 | 7/2002 | Feder et al. | |
| 2002/0128009 A1 * | 9/2002 | Boch et al. | 455/426 |
| 2002/0167954 A1 | 11/2002 | Highsmith et al. | |
| 2002/0191565 A1 | 12/2002 | Mani et al. | |
| 2003/0015943 A1 | 1/2003 | Kim et al. | |
| 2003/0040335 A1 | 2/2003 | McIntosh et al. | |
| 2003/0043928 A1 | 3/2003 | Ling et al. | |
| 2003/0143947 A1 | 7/2003 | Lyu | |

| | | | |
|---|---|---|---|
| 2003/0162498 | A1 | 8/2003 | Rofheart et al. |
| 2003/0216121 | A1 | 11/2003 | Yarkosky |
| 2004/0001477 | A1 | 1/2004 | D'Amico et al. |
| 2004/0003804 | A1 | 1/2004 | Yasui |
| 2004/0010609 | A1 | 1/2004 | Vilander et al. |
| 2004/0037565 | A1 | 2/2004 | Young et al. |
| 2004/0066326 | A1* | 4/2004 | Knapp ........................ 342/350 |
| 2004/0102195 | A1 | 5/2004 | Naghian et al. |
| 2004/0198453 | A1 | 10/2004 | Cutrer et al. |
| 2004/0204097 | A1 | 10/2004 | Scheinert et al. |
| 2004/0219950 | A1 | 11/2004 | Pallonen et al. |
| 2004/0233877 | A1* | 11/2004 | Lee et al. .................... 370/338 |
| 2004/0248580 | A1 | 12/2004 | Backes et al. |
| 2004/0258100 | A1 | 12/2004 | Jantti et al. |
| 2005/0007993 | A1 | 1/2005 | Chambers et al. |
| 2005/0143091 | A1 | 6/2005 | Shapira et al. |
| 2005/0147067 | A1 | 7/2005 | Mani et al. |
| 2005/0148368 | A1 | 7/2005 | Scheinert et al. |
| 2005/0153712 | A1 | 7/2005 | Osaka et al. |
| 2005/0157675 | A1 | 7/2005 | Feder et al. |
| 2005/0176368 | A1* | 8/2005 | Young et al. ............... 455/11.1 |
| 2005/0201323 | A1 | 9/2005 | Mani et al. |
| 2005/0221817 | A1 | 10/2005 | Pinola |
| 2005/0227710 | A1 | 10/2005 | Yamashita |
| 2005/0233710 | A1 | 10/2005 | Lakkis et al. |
| 2005/0243785 | A1 | 11/2005 | Sabat, Jr. et al. |
| 2005/0250503 | A1 | 11/2005 | Cutrer |
| 2006/0025158 | A1* | 2/2006 | Leblanc et al. ........... 455/456.2 |
| 2006/0041680 | A1 | 2/2006 | Proctor, Jr. et al. |
| 2006/0072602 | A1 | 4/2006 | Achanta |
| 2006/0094470 | A1 | 5/2006 | Wake et al. |
| 2006/0121944 | A1 | 6/2006 | Buscaglia et al. |
| 2006/0123053 | A1 | 6/2006 | Scannell, Jr. |
| 2006/0133346 | A1 | 6/2006 | Chheda et al. |
| 2006/0172710 | A1* | 8/2006 | Cahana et al. .............. 455/101 |
| 2006/0193295 | A1 | 8/2006 | White et al. |
| 2006/0234722 | A1 | 10/2006 | Hanebeck et al. |
| 2007/0099562 | A1* | 5/2007 | Karabinis et al. .......... 455/12.1 |
| 2008/0014948 | A1* | 1/2008 | Scheinert .................... 455/444 |
| 2009/0061766 | A1* | 3/2009 | Ding et al. ................. 455/11.1 |

FOREIGN PATENT DOCUMENTS

| | | |
|---|---|---|
| EP | 0391597 | 10/1990 |
| EP | 0664621 | 7/1995 |
| EP | 0876073 | 11/1998 |
| GB | 2253770 | 9/1992 |
| GB | 2289198 | 11/1995 |
| GB | 2315959 | 2/1998 |
| GB | 2320653 | 6/1998 |
| WO | 9115927 | 10/1991 |
| WO | 9533350 | 12/1995 |
| WO | 9628946 | 9/1996 |
| WO | 9716000 | 5/1997 |
| WO | 9732442 | 9/1997 |
| WO | 9824256 | 6/1998 |
| WO | 9937035 | 7/1999 |
| WO | 0174013 | 10/2001 |
| WO | 0174100 | 10/2001 |
| WO | 2004034508 | 4/2004 |

OTHER PUBLICATIONS

Harvey et al., "Cordless Communications Utilising Radio Over Fibre Techniques for the Local Loop", "IEEE International Conference on Communications", Jun. 1991, pp. 1171-1175, Publisher: IEEE.

Wala, "A New Microcell Architecture Using Digital Optical Transport", "Proceedings of the Vehicular Technology Conference", May 18, 1993, pp. 585-588, Publisher: IEEE, Published in: US.

Akos et al, "Direct Bandpass Sampling of Multiple Distinct RF Signals", Jul. 1, 1999, pp. 983-988, vol. 47, Publisher: IEEE Transactions on Communications.

Foxcom Wireless Proprietary Information, "Litenna In-Building RF Distribution System", 1998, pp. 1-8.

1998 Foxcom Wireless Proprietary Information, "Application Note "RFiber- RF Fiberoptic Links for Wireless Applications"", 1998, pp. 3-11, Published in: US.

Nakatsugawa et al., "Software Radio Base and Personal Stations for Cellular/PCS Systems", 2000, pp. 617-621, Publisher: IEEE.

"Tektronix Synchronous Optical Network (Sonet)", "http://www.iec. org/online/tutorials/sonet/topic03.html", 2002, Publisher: International Engineering Consortium.

Georges et al., "U.S. Appl. No. 08/635,368", "Distribution of Radio-Frequency Signal Through Low Bandwidth Infrastructures", Filed Apr. 19, 1996, Publisher: Abandoned, Published in: US.

Schwartz, "U.S. Appl. No. 09/560,656", "Adaptive Capacity Management in a Centralized Basestation Architecture", Filed Apr. 27, 2000, Publisher: Abandoned, Published in: US.

Wong et al., "US Application Serial No. 09/561,372", "A Cellular Communications System With Centralized Capacity Resources Using DWDM Fiber Optic Backbone", Filed Apr. 28, 2000, Publisher: Abandoned, Published in: US.

International Searching Authority, "International Search Report", Apr. 18, 2008, Published in: WO.

"Multiple-Input Multiple-Output Communications", "http://en. wikipedia.org/wiki/Multiple-input_multiple-output_communications", May 17, 2007, Publisher: Wikipedia, Published in: US.

"Products: nanGSM Picocell", "http://www.ipaccess.com/nanGSM/nanGSM.htm", Aug. 2, 2007, pp. 1-8, Publisher: ip.access.

B. Schweber, Maintaining cellular connectivity indoors demands sophisticated design, EDN Magazine, Dec. 21, 2000, pp. 46, 48, 50.

Edge Introduction of high-speed data in GSM/CPRS networks, Ericsson AB, 2003, pp. 1-16.

Voice over Wireless LAN Solution Brief, Hewlett-Packard Development Co., L.P., 2006, pp. 0-8.

* cited by examiner

SYSTEM FOR AND METHOD OF PROVIDING REMOTE COVERAGE AREA FOR WIRELESS COMMUNICATIONS

FIELD OF THE INVENTION

The present invention relates to wireless networks and, more particularly, to providing remote coverage areas for mobile receivers in wireless networks.

BACKGROUND OF THE INVENTION

In conventional wireless cellular telephone networks, macro base stations provide wireless cellular coverage for mobile units. A macro base station comprises multiple transceiver units, outputs relatively high power (i.e. 10 watts or more) to its antenna(s) and is communicatively coupled to a telephone network via a backhaul connection. Because macro base stations output high power, they can provide large areas of coverage.

The capacity of a macro base station can be expanded to a limited degree by the addition of transceivers and antennas to the macro base station. Additional macro base stations can also be added to the network. However, these measures have limitations due to interference among macro base stations caused by their large coverage areas and high output power. In addition, signal attenuation caused by building structures (i.e. indoor penetration loss) can result in communication difficulties for mobile units when located indoors.

Wireless broadcast networks communicate information, such as radio, television, multimedia services and datacasting, to mobile receivers via wireless radio transmission. For example, a mobile telephone may be equipped for both two-way voice communications and for receiving broadcast transmissions. Alternatively, a dedicated receiver, such as a satellite radio receiver, may be used to receive broadcast transmissions. Examples of wireless broadcast networks include mobile digital broadcast television (also called DTV and Mobile TV) and satellite radio. Mobile digital broadcast television standards include Digital Video Broadcasting-Handheld (DVB-H) and Digital Multimedia Broadcasting (DMB). Satellite radio typically operates according to proprietary standards of the operators (e.g., SIRIUS Satellite Radio, Inc. and XM Satellite Radio, Inc.). A wireless broadcast system, such as for mobile digital broadcast television, may employ an antenna located on a transmission tower or building that outputs high power, similarly to a cellular telephone macro base station. Satellite radio operators may employ terrestrial repeaters located on buildings to improve reception in metropolitan areas.

The cell radius for such broadcast systems is relatively large (e.g., 15 km to 30 km) when receivers are located outdoors. However, as with cellular telephone networks, these broadcast systems can experience difficulties due to indoor penetration loss. For example, if a receiver is located indoors, an additional indoor penetration loss of 8 dB to 30 dB is common. This reduces the cell size significantly and often causes sufficient loss in signal strength to prevent proper signal reception.

SUMMARY OF THE INVENTION

The present invention is a system for and a method of providing one or more remote coverage areas for wireless communications. In an embodiment, a system for providing a remote coverage area for wireless communications comprises a local system that generates a first radio communication signal and a remote system located geographically remote from the local system. The remote system comprises a first converter that converts the first radio communication signal to a stream of data packets, a network that receives the stream of data packets from the first converter; and a second converter that receives the stream of data packets from the network and generates the remote coverage area by converting the stream of data packets to a second radio communication signal. The remote coverage area may be located indoors.

BRIEF DESCRIPTION OF THE DRAWINGS

The present invention is described with respect to particular exemplary embodiments thereof and reference is accordingly made to the drawings in which.

DETAILED DESCRIPTION OF THE INVENTION

Figure 1:
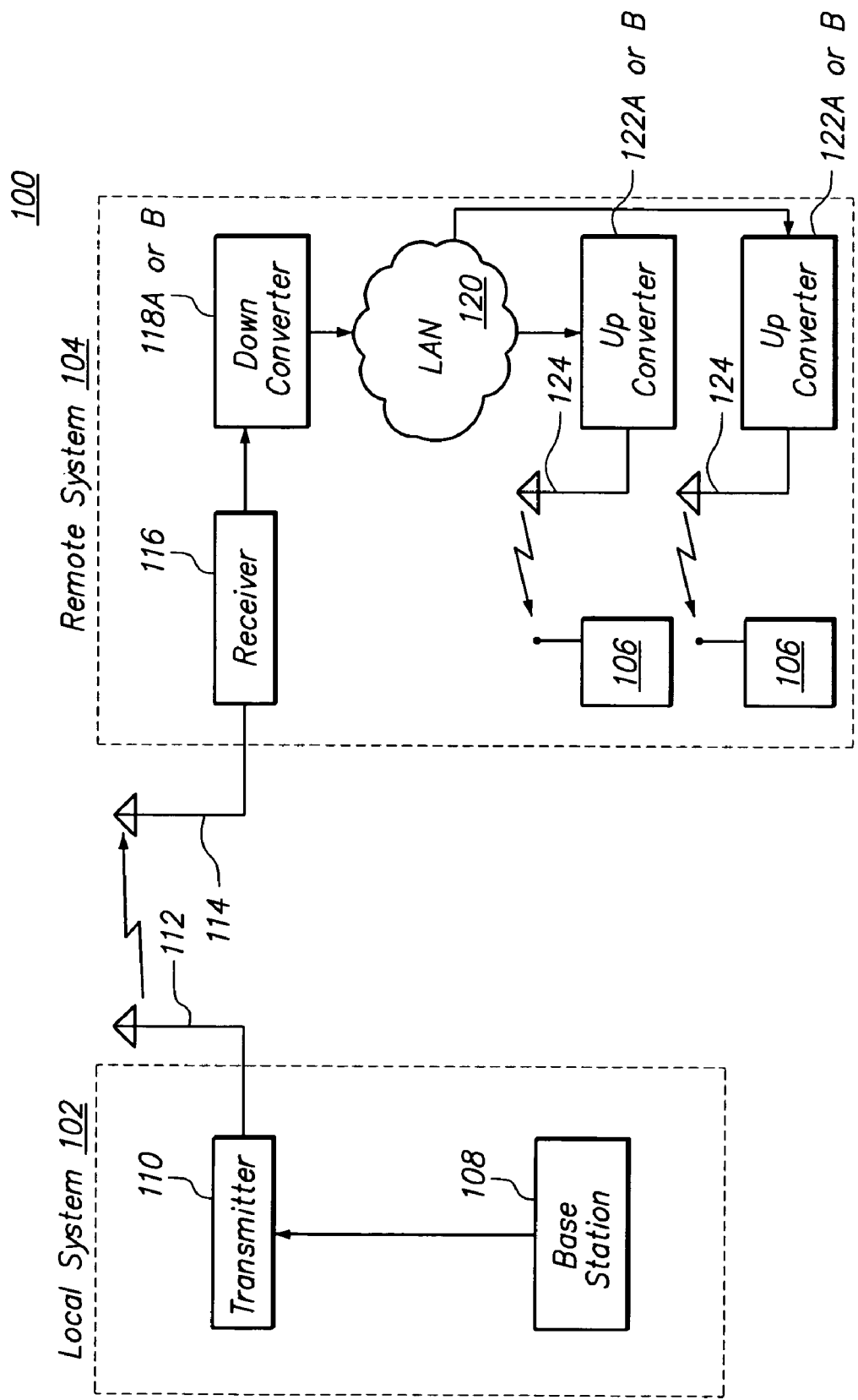
FIG. 1 illustrates a system for providing a remote coverage area for wireless broadcast communications in accordance with an embodiment of the present invention.

FIG. 1 illustrates a system for providing a remote coverage area for wireless broadcast communications in accordance with an embodiment of the present invention. The system 100 includes a first (local) system 102 and a second (remote) system 104. The local system 102 is local to the premises of a broadcast service provider, such as a digital broadcast television station or a satellite radio service. The remote system 104 is preferably geographically remote from the local system 102. By geographically remote, what is meant is that the remote system 104 is separated from the local system 102 by a distance of approximately 100 meters or more. In embodiments, this distance can be greater than 1 kilometer, or greater than 10 kilometers. The remote system 104 provides one or more remote coverage areas in which mobile receivers 106 may receive information broadcast from the local system 102. Portions of the remote system 104 may be located indoors so as to provide one or more indoor coverage areas for the mobile receivers 106 when they are located indoors.

The local system 102 includes a base station 108 from which broadcast content originates. For example, the base station 108 may be a base station of a digital broadcast television service provider. The base station 108 may receive the broadcast content from another location via a wired backhaul (not shown). Alternatively, the local system 102 may serve as a wireless repeater. For example, a terrestrial receiver that receives a signal from a remotely located base station, or a satellite receiver that receives a signal from a satellite, may serve as the base station 108 for the local system 102.

The local system 102 includes a transmitter 110 coupled to the base station 108. The transmitter 110 receives the broadcast content from the base station 108 and transmits the content in the form of a wireless analog signal via an antenna 112 to the remote system 104. To accomplish this, the transmitter 110 may include a frequency converter that converts a signal received from the base station 108 in a first frequency (e.g., intermediate frequency or IF) to a second frequency (e.g., radio frequency or RF) used by the antenna 112. The transmitter 110 may include an amplifier that amplifies the signal received from the base station 108 to a level suitable for transmission via the antenna 112.

The remote system 104 includes an antenna 114 and a receiver 116 for receiving the signal transmitted by the local system 102. The signal received by the remote system 104 is passed to a converter 118A (FIG. 2) or 118B (FIG. 4) which converts the content of the received analog signal to a stream of digital packets. In a preferred embodiment, the digital packets are Internet Protocol (IP) packets. The digital packets are then distributed via a network (e.g., a local area network or LAN) 120 to one or more converters 122A (FIG. 3) or 122B (FIG. 5). Each packet may be broadcast to all converters 122A or 122B or addressed to an appropriate one of the converters 122A or 122B. The converters 122 convert the digital packets received from the network 120 to analog signals which are then transmitted via one or more antennas 124 to the mobile receivers 106. The analog signal transmitted by each antenna 124 is preferably a regenerated version of the signal received by the remote system 104 from the local system 102 in that it has the same channel, frequency, modulation and formatting characteristics. For example, assuming the antenna 114 receives a signal on a particular channel in the 1900 MHz frequency band, the signals transmitted by the antennas 124 are also on that channel in the 1900 MHz frequency band. These regenerated signals also have some delay introduced by converting the analog signal to digital packets, transmitting them via the network 120 and then converting the digital packets back to analog. When an Ethernet network is used for the network 120 the delay can be as low as a few hundred microseconds.

The antennas 112 and 114 are preferably located outdoors so as to minimize signal attenuation between the local system 102 and the remote system 104. However, the other elements of the remote system 104, and particularly the antennas 124, are preferably located indoors so as to provide one or more indoor coverage areas for the mobile receivers 106. Each antenna 124 provides a corresponding coverage area for mobile receivers 106 that are located within range of the antenna 124.

By employing the network 120 to distribute the broadcast content in digital packets, the converters 122A or 122B (and, therefore, the antennas 124) can be located a distance from each other and from the converter 118A or 118B. This allows the remote system 104 to provide indoor coverage areas throughout the interior of structures of a variety of sizes and configurations, such as an office building, a campus of buildings, a convention center, an airport, etc. For example, assuming the network 120 operates in accordance with 10BASE-T, 100BASE-T or gigabit Ethernet, this distance can be as much as 100 meters or more (since each twisted pair network segment can be 100 meters long and the network 120 may perform signal regeneration between segments). Other network protocols may be employed, such as 10 gigabit Ethernet. While two converters 122A or 122B and antennas 124 are shown, it will be apparent that additional converters 122A or 122B and antennas 124 may be used so as to provide larger or additional coverage areas.

Figure 2:
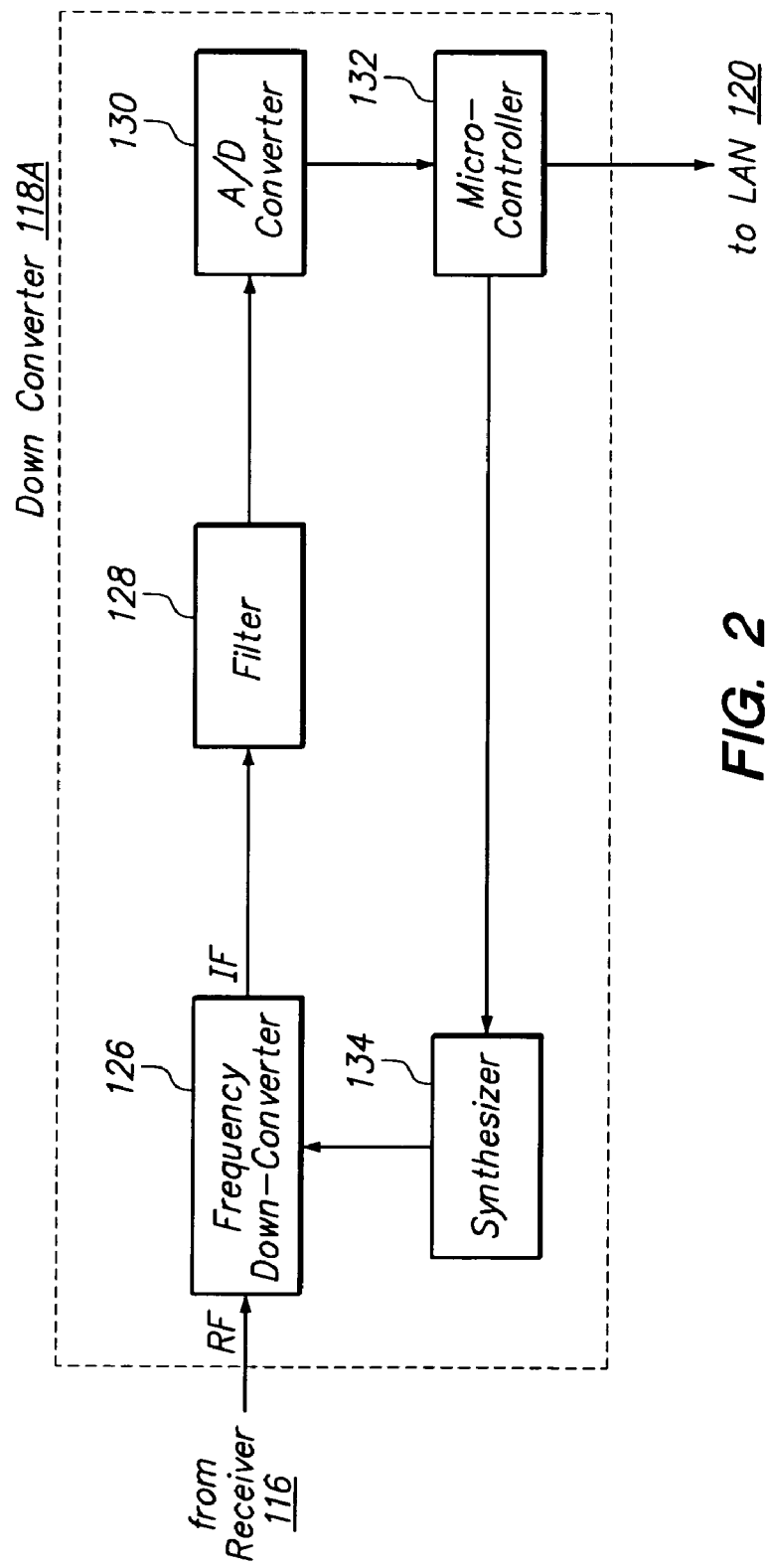
FIG. 2 illustrates an analog signal to digital packet down converter in accordance with an embodiment of the present invention.

FIG. 2 illustrates details of the analog signal to digital packet down converter 118A (shown in FIG. 1) in accordance with an embodiment of the present invention. The signal from the local system 102 (FIG. 1) is received via the receiver 116 (FIG. 1) and passed to a frequency down-converter 126 (FIG. 2). The frequency down-converter 126 converts the received signal, which may be an RF signal, to a lower frequency, such as IF.

The down-converted IF signal may then be passed to a filter 128 which removes out-of-band frequency components (which may include upper and lower frequencies) in preparation for digital sampling of the analog signal. The signal is then passed to an analog-to-digital converter 130 which performs digital sampling of the signal. The sampling rate is at least twice the highest frequency of interest contained in the analog signal.

The digital samples are then passed to a micro-controller 132 which buffers the samples and inserts them into the payload portions of properly formatted data packets (e.g., IP packets). For example, each packet payload may include two to eight digital samples. The micro-controller 132 then transmits the packets to converters 122A (FIGS. 1 and 3) via the network 120 (FIG. 1).

A synthesizer 134 may be included in the converter 118A for generating a constant frequency signal used by the frequency down converter 126. The frequency components of the input signal received by converter 118A and the frequency of the signal generated by the synthesizer 134 determine the output frequency components of the frequency down converter 126. The synthesizer 134 may be controlled by the micro-controller 132 to select the output frequency of the synthesizer 134. This allows the converter 118A to perform its functions for various different input frequency bands.

Figure 3:
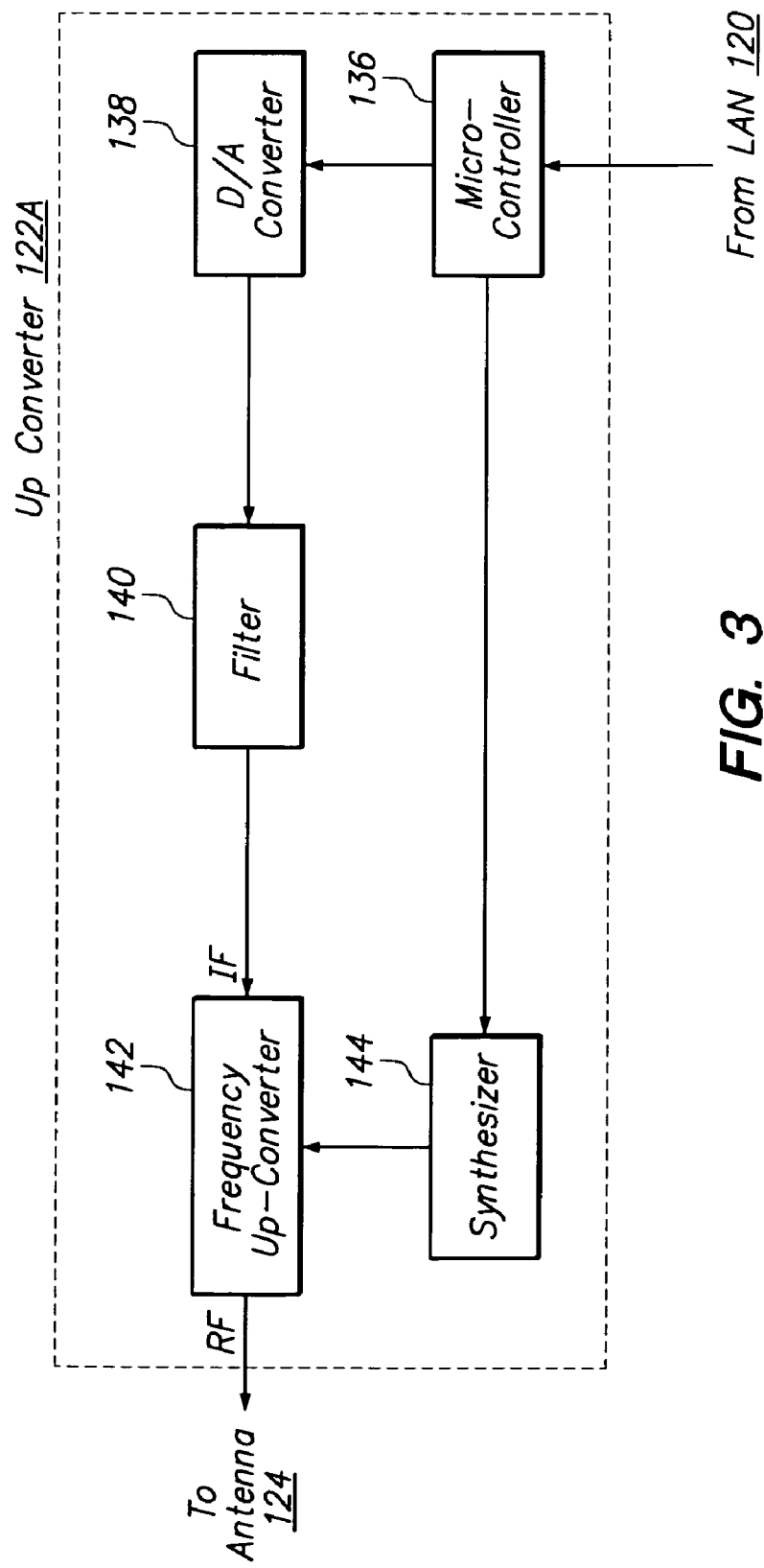
FIG. 3 illustrates a digital packet to analog signal up converter in accordance with an embodiment of the present invention.

FIG. 3 illustrates details of the digital packet to analog signal up converters 122A (shown in FIG. 1) in accordance with an embodiment of the present invention. The digital packets received from the network 120 are passed to a micro-controller 136 which processes the packets to remove the digital samples contained in the payload portion of the packets. The digital samples are then passed to a digital-to-analog signal converter 138 which converts the digital samples at a constant rate to an analog signal so as to reproduce the analog signal prior to sampling at the converter 130 (FIG. 2). This reproduced analog signal may be, for example, an IF signal. The analog signal may then be passed to a filter 140 which performs smoothing on the signal by removing undesired frequencies.

The analog signal may then be passed to a frequency up-converter 142 which converts the IF or baseband signal to a frequency suitable for transmission via the antennas 124 (FIG. 1) to mobile receivers 106 (FIG. 1). The frequency up-converter 142 may also amplify the signal to a suitable level. As mentioned, this signal may be transmitted by antennas 124 at RF and preferably in the same frequency band as the signal received from the local system 102.

A synthesizer 144 may be included in the converter 122A for generating a constant frequency signal used by the frequency up converter 142. The frequency components of the signal input to the frequency up converter 142 and the frequency of the signal generated by the synthesizer 144 determine the output frequency components of the frequency up converter 142. The synthesizer 144 may be controlled by the micro-controller 136 to select the output frequency of the synthesizer 144. This allows the converter 122A to generate various different output frequencies to antenna 124. Preferably, the output frequency of the converter 122A is the same as the input frequency to the converter 118A (FIG. 2).

Figure 4:
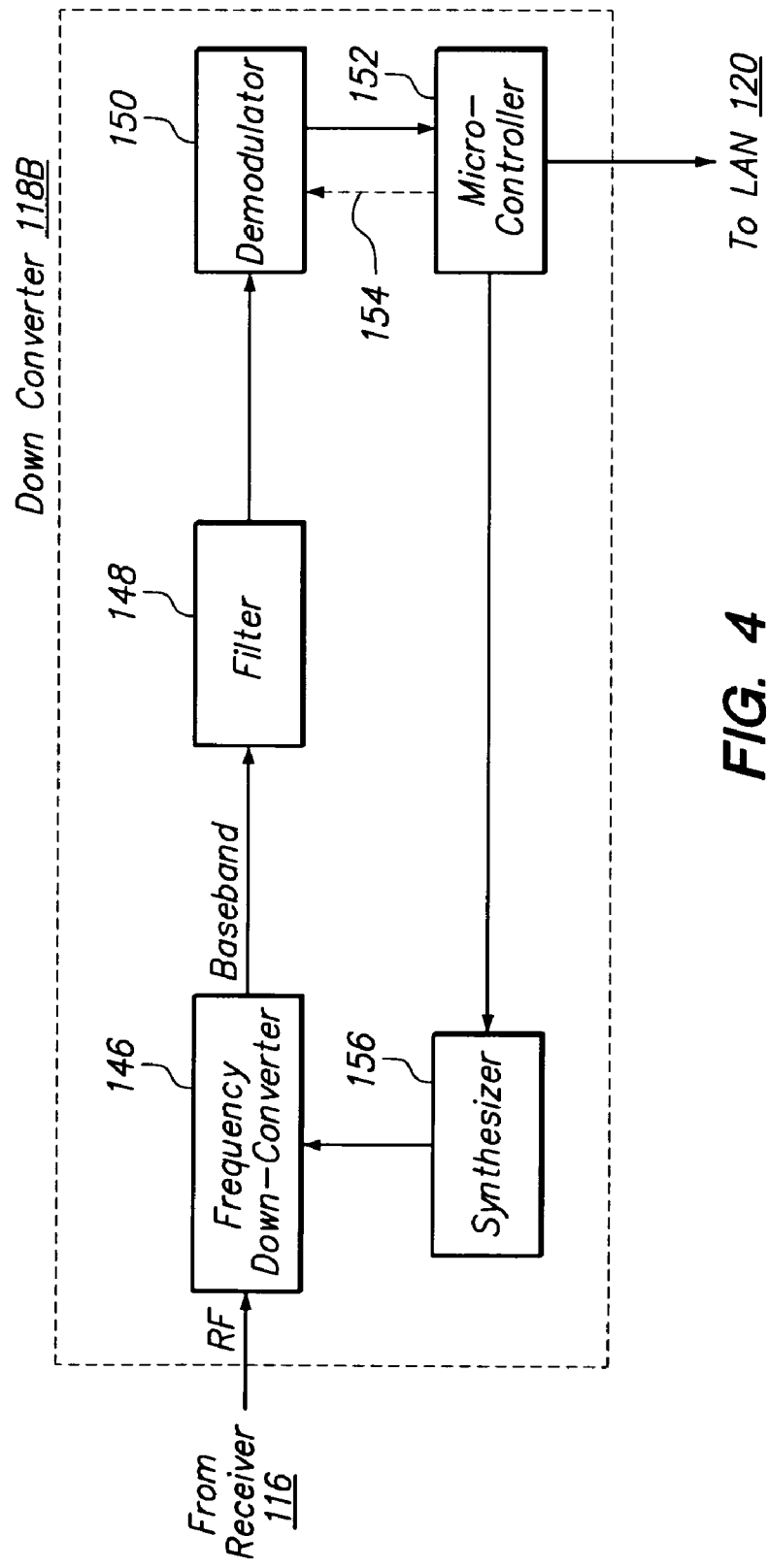
FIG. 4 illustrates an analog signal to digital packet down converter in accordance with an embodiment of the present invention.
Figure 5:
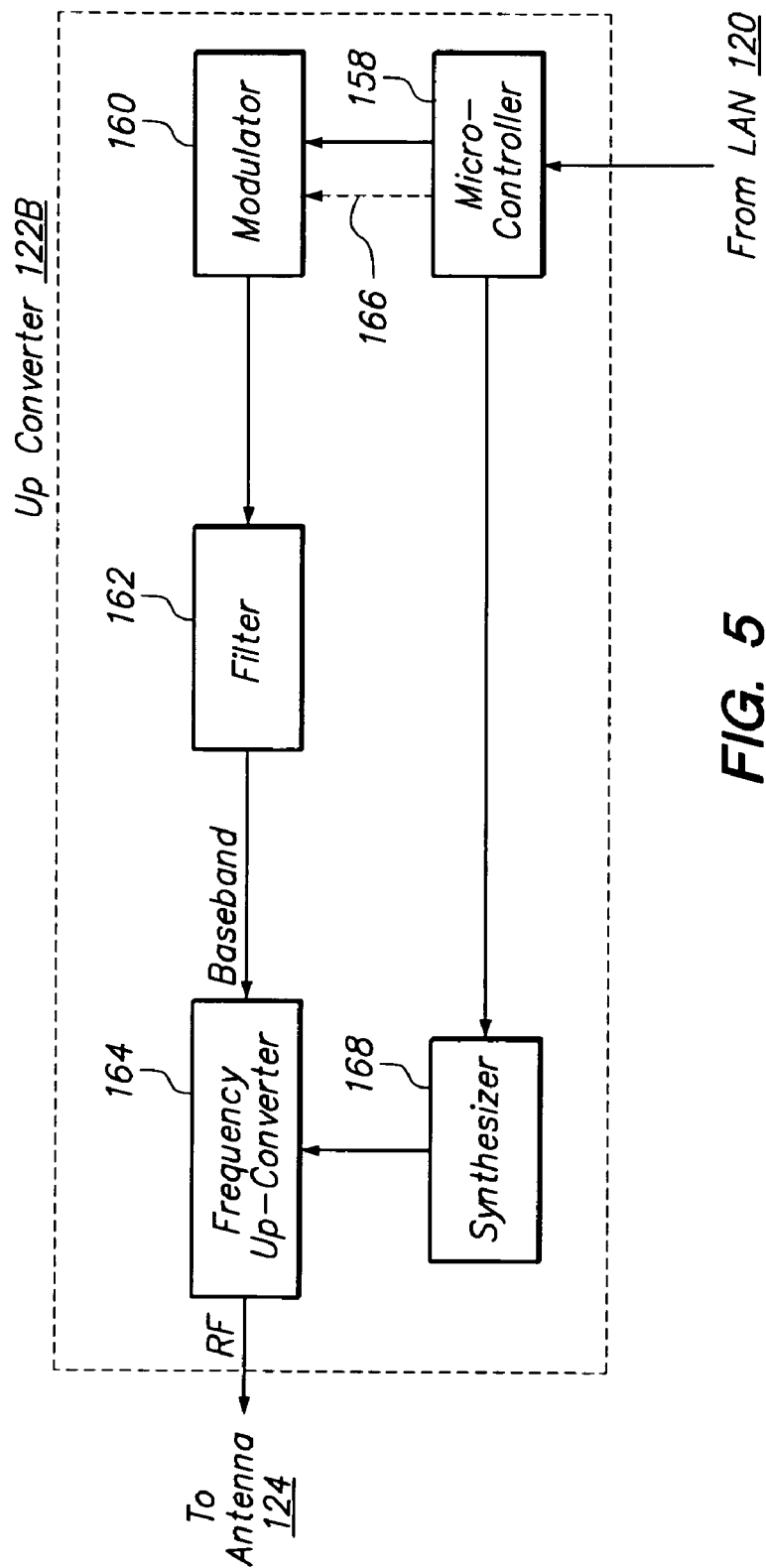
FIG. 5 illustrates a digital packet to analog signal up converter in accordance with an embodiment of the present invention.

FIG. 4 illustrates details of the analog signal to digital packet down converter 118B (shown in FIG. 1) in accordance with an embodiment of the present invention. The converter 118B differs from the converter 118A in that it performs processing at baseband rather than IF. The signal from the local system 102 (FIG. 1) is received via the receiver 116 (FIG. 1) and passed to a frequency down-converter 126 which converts the received signal, which may be an RF signal, to baseband.

The baseband signal may then be passed to a filter 148 which removes out-of-band frequency components in preparation for demodulation of the analog signal. The signal is then passed to a demodulator 150 which performs demodulation of the filtered baseband signal by converting the baseband signal to digital message symbols. A micro-controller 152 buffers the symbols and inserts them into the payload portions of properly formatted data packets (e.g., IP packets). For example, each packet payload may include two to eight symbols. The micro-controller 152 then transmits the packets to converters 122B (FIGS. 1 and 5) via the network 120 (FIG. 1).

The signal received by the down converter 118B may be modulated according to a variety of different modulations schemes, such as QPSK, 16 QAM or 64 QAM. If the received signal is down-converted to IF as in the case for the down converter 118A, demodulation is not necessary. However, if the received signal is demodulated to baseband, as is the case for the down converter 118B, the demodulator 150 is configured according to the modulation scheme of the received signal so it can appropriately demodulate the baseband signal by decoding the baseband signal into transmitted message symbols. In an embodiment, the demodulator 150 is configured to demodulate the baseband signal in any of a variety of modulations schemes.

In an embodiment, the demodulator 150 is configured to the highest inclusive modulation scheme among the possible modulation schemes of the received signal. By highest inclusive modulation scheme, what is meant is that when the demodulator 150 is configured according to the highest inclusive modulation scheme, the largest number of other included modulation schemes can also be demodulated by the demodulator 150. For example, Global System for Mobile Communications (GSM), a cellular telephone communications protocol, uses Gaussian-Filtered, Minimum Shift (GMSK) modulation. Enhanced Data rate for GSM Evolution (EDGE), which is a specification for data transfer on GSM channels, uses 8 Phase-Shift Keying (8 PSK) for modulation. Therefore, assuming that the possible modulation schemes for the received signal include GMSK and 8 PSK, the demodulator 150 is preferably configured to demodulate 8 PSK; as a result, the down-converter and can demodulate the received signal if it is modulated in accordance with either GMSK or 8 PSK. Thus, 8 PSK is the highest inclusive modulation scheme among GMSK and 8 PSK. Other communications technologies and protocols use variable modulation schemes. For example, Universal Mobile Telecommunications System (UMTS) and Code Division Multiple Access (CDMA) protocols both use Quadrature Phase Shift Keying (QPSK) and 16 Quadrature Amplitude Modulation (16 QAM). 16 QAM is inclusive of QPSK. Therefore, in order to demodulate QPSK and 16 QAM signals, the down-converter 126 needs to be configured for demodulating 16 QAM only. Further, 64 QAM is inclusive of 16 QAM (where every forth symbol position is used). Accordingly, the demodulator 150 can be configured in accordance with 64 QAM so that it can demodulate signals in accordance with 64 QAM, 16 QAM and QPSK.

In addition, or alternatively, so that the demodulator 150 is configured for the correct one of these modulation schemes for a particular received signal, the converter 118B may optionally include a control path 154 which allows the micro-controller 152 to configure the demodulator 150 according to a particular modulation scheme.

A synthesizer 156 may be included in the converter 118B for generating a constant frequency signal used by the frequency down converter 146. The synthesizer 156 may be controlled by the micro-controller 152 so that the converter 118B is able to perform its functions for various different input frequency bands.

As mentioned, in order to convert the baseband signal to digital symbols which can be inserted into the payload portions of properly formatted data packets, the message symbols of the baseband signal need to be decoded by the demodulator 150. This decoding process is expected to take longer than the digital sampling of the IF signal performed by the analog to digital converter 130 of the converter 118A. However, the IF signal processed by the converter 118A requires a higher sampling rate, and thus a higher bit-rate on the sampled digital data stream, compared to a base band signal. Each such digital sample may have, for example, 8-14 bits of resolution. Accordingly, there exists a tradeoff between the above-described IF and baseband signal processing techniques.

FIG. 5 illustrates details of the digital packet to analog signal up converters 122B (shown in FIG. 1) in accordance with an embodiment of the present invention. The converter 122B differs from the converter 122A in that it performs processing at baseband rather than at IF. The digital packets received from the network 120 are passed to a micro-controller 158 which processes the packets to remove the message symbols contained in the payload portion of the packets. The symbols are then passed to a modulator 160 which converts the symbols at a constant rate to an appropriately encoded analog baseband signal. The analog baseband signal may then be passed to a filter 162 which performs smoothing on the signal by removing undesired frequencies.

The analog signal may then be passed to a frequency up-converter 164 which converts the baseband signal to a frequency suitable for transmission via the antennas 124 (FIG. 1) to mobile receivers 106 (FIG. 1). The frequency up-converter 164 may also amplify the signal to a suitable level. As mentioned, this signal may be transmitted by antennas 124 at RF and preferably in the same frequency band as the signal received from the local system 102.

A synthesizer 168 may be included in the converter 122B for generating a constant frequency signal used by the frequency up converter 164. The synthesizer 168 may be controlled by the micro-controller 158 so that the converter 122B to perform its functions for various different input frequencies.

So that the modulator 160 is configured for the correct one of several possible modulation schemes for a particular received signal, the converter 122B may optionally include a control path 166 which allows the micro-controller 158 to configure the modulator 160 according to a particular modulation scheme. For example, in an initialization phase, the micro-controller 152 of the converter 118B (FIG. 4) may encode a data packet with information that indicates the correct modulation scheme. This data packet is then sent to the micro-controller 158 of the converter 122B (FIG. 5). For this purpose, the micro-controller 152 (FIG. 4) is preferably able to determine the modulation scheme of the signal received from the local system 102 (FIG. 1). The micro-controller 152 may, for example, determine the modulation scheme from the number of bits per symbol received from the demodulator 150 (FIG. 4).

Figure 6:
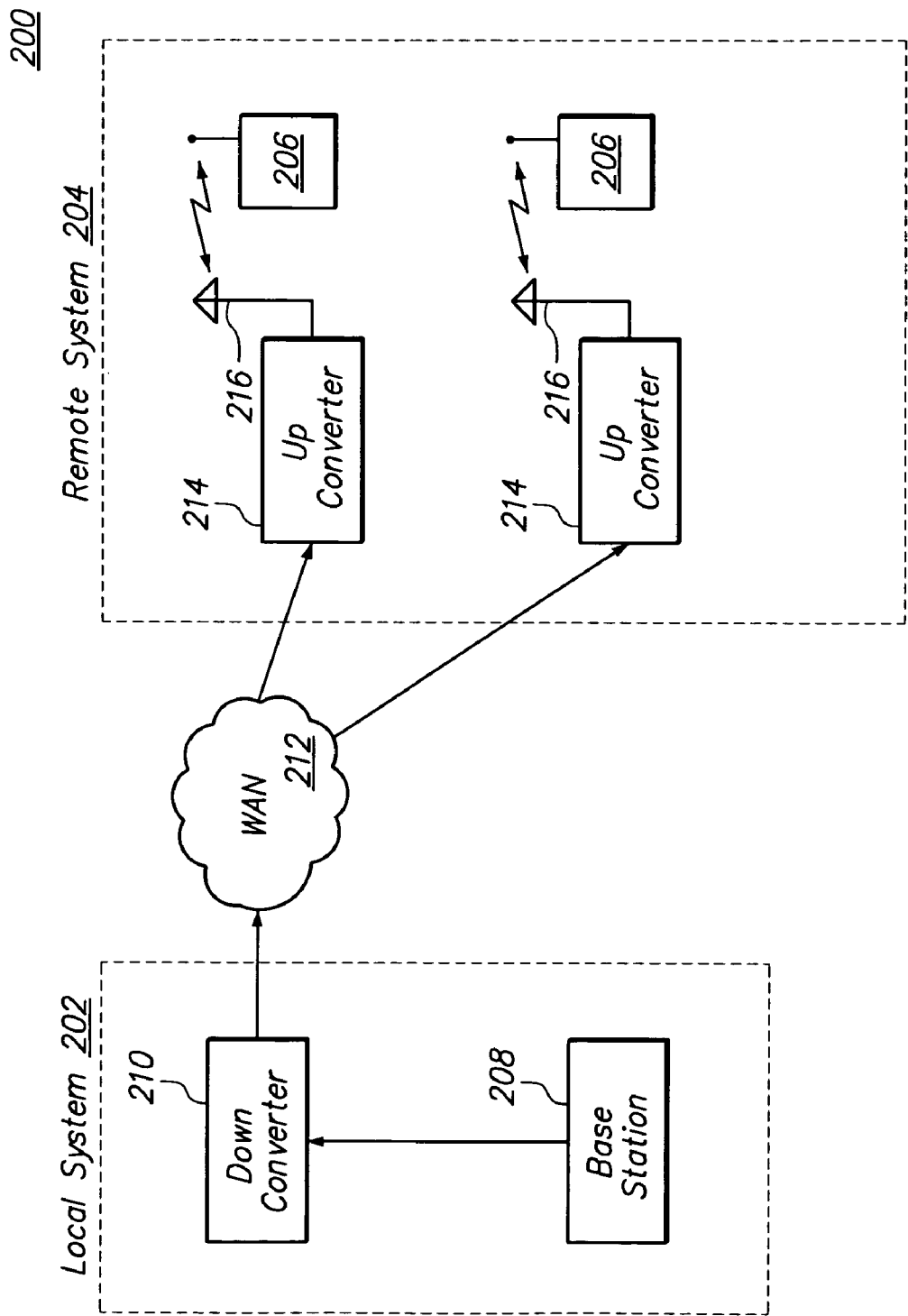
FIG. 6 illustrates an alternative embodiment of a system for providing a remote coverage area for wireless broadcast communications in accordance with an embodiment of the present invention.

FIG. 6 illustrates an alternative embodiment of a system 200 for providing a remote coverage area for wireless broadcast communications. The system 200 includes a first (local) system 202 and a second (remote) system 204. The local system 202 is local to the premises of a broadcast service provider, such as a digital broadcast television station or a satellite radio service. The remote system 204 is preferably geographically remote from the local system 202. The remote system 204 provides one or more remote coverage areas in which mobile receivers 206 may receive information broadcast from the local system 202. Portions of the remote system 204 may be located indoors so as to provide an indoor coverage area for the mobile receivers 206 when they are located indoors.

The local system 202 includes a base station 208 from which broadcast content originates. For example, the base station 208 may receive the broadcast content from another location via a wired backhaul or the local system 102 may serve as a wireless repeater. The local system 202 includes an analog signal to digital packet down converter 210 coupled to the base station 208. The converter 210 receives the broadcast content from the base station 208, converts the content to a stream of digital packets and transmits the content to the remote system 204.

The converter 210 may be identical to the converter 118A or 118B shown in FIGS. 2 and 4. Thus, assuming the base station 208 generates an RF signal, the converter 210 may down-convert the signal from the base station 208 to IF and process the signal as described above in connection with the converter 118A. Alternatively, the converter 210 may down-convert the signal from the base station 208 to baseband and process the signal as described above in connection with the converter 118B. The packets generated by the converter 210 are communicated to the remote system 204 via a network (e.g., a wide area network or WAN) 212, such as the Internet.

The remote system 204 includes one or more converters 214 that convert the digital packets received from the network 212 to analog signals which are then transmitted via antennas 214 to the mobile receivers 206. The converters 214 may be identical to the converter 122A or 122B shown in FIGS. 3 and 5. Thus, the converters 214 may convert digital samples received in the digital packets to analog IF and then up convert the IF signal to RF, as described above in connection with the converter 122A. Alternatively, the converters 214 may generate a baseband signal from message symbols retrieved from the digital packets and then up convert the baseband signal to RF, as described above in connection with the converter 118B. Each packet sent to the remote system 204 may be broadcast to all converters 214 or addressed to an appropriate one of the converters 214.

The analog signal transmitted by each antenna 216 is preferably a regenerated version of the signal generated by the base station 208 of the local system 202 in that it has the same frequency components and content. These regenerated signals also have some delay introduced by converting the analog signal to digital packets, transmitting them via the network 212 and then converting the digital packets back to analog. When the signal is routed through the Internet (used for the network 212), the delay of the signal is can reach tens or even hundreds of milliseconds. If dedicated communication links are used for the network 212 rather than the Internet, the delay can be reduced to a few milliseconds depending upon the distance and configuration of the network 212 (e.g., the number of routers/switches traversed by the packets as they travel between the local system 202 and the remote system 204).

Many of the elements of the remote system 204, and particularly the antennas 216, are preferably located indoors so as to provide indoor coverage areas for the mobile receivers 206. Each antenna 216 provides a corresponding coverage area for mobile receivers 206 that are located within range of the antenna 216.

By employing the network 212 to transmit the broadcast content in digital packets, the converters 214 (and, therefore, the antennas 216) can be located essentially anywhere in which they can be coupled to the network 212. For example, where the Internet is employed for the network 212, the converters 214 and antennas 216 can be located tens or hundreds of miles away from the local system 202. Similarly to the system 100 of FIG. 1, the configuration of the system 200 allows the remote system 204 to provide indoor coverage areas throughout the interior of structures of a variety of sizes and configurations, such as an office building, a campus of buildings, a convention center, an airport, etc. While two converters 214 and antennas 216 are shown, it will be apparent that additional converters 214 and 216 antennas may be used so as to provide larger or additional coverage areas.

Figure 7:
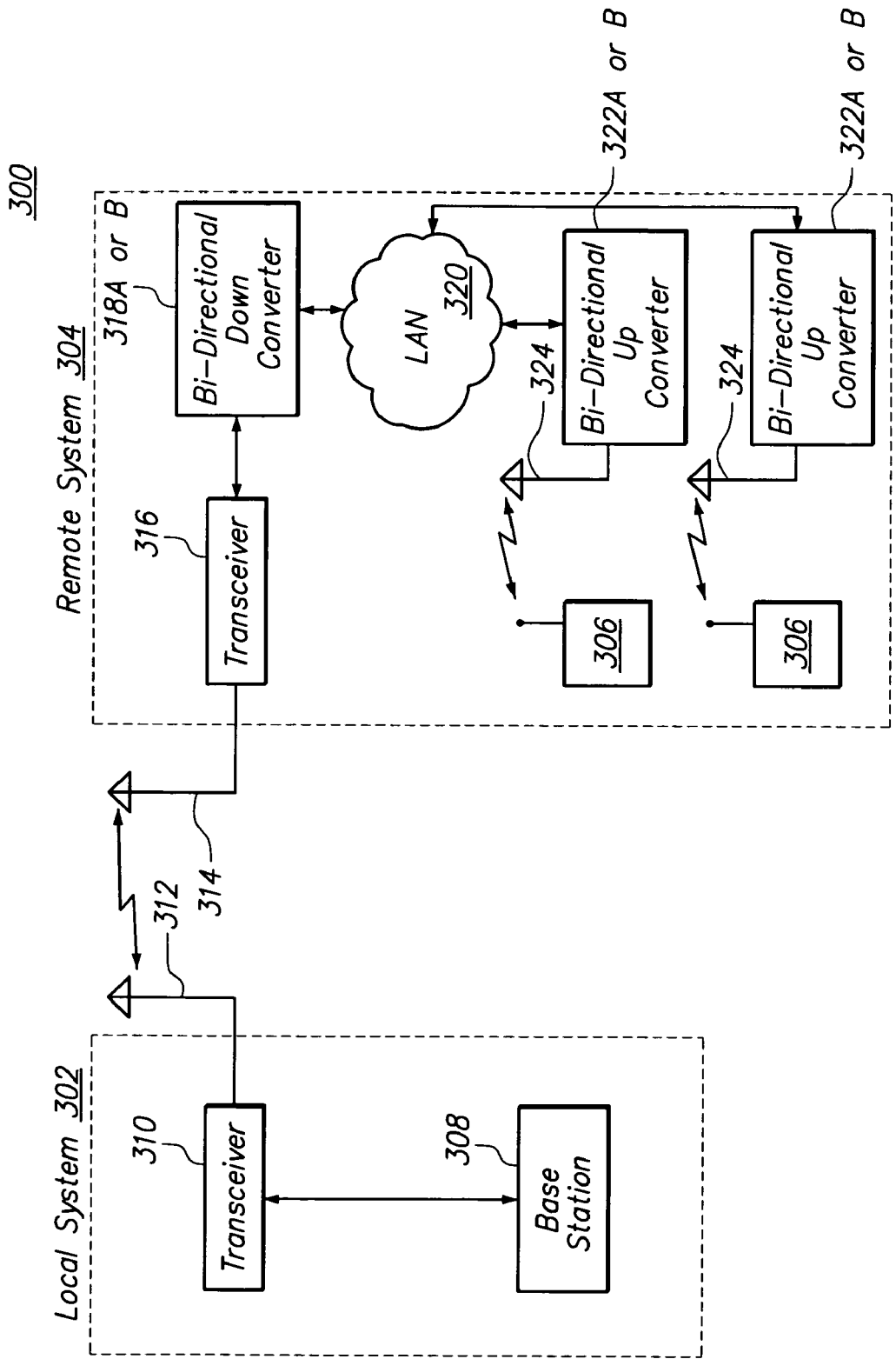
FIG. 7 illustrates a system for providing a remote coverage area for wireless two-way communications in accordance with an embodiment of the present invention.

FIG. 7 illustrates a system 300 for providing a remote coverage area for wireless two-way communications in accordance with an embodiment of the present invention. The system 300 is configured similarly to the system 100 shown in FIG. 1 and functions in a similar manner, except that the system 300 provides for two-way communications.

The system 300 includes a first (local) system 302 and a second (remote) system 304. The local system 302 is local to the premises of a two-way communication service provider, such as a cellular telephone service provider. The remote system 304 is preferably geographically remote from the local system 302. The remote system 304 provides one or more remote coverage areas in which mobile units 306, such as cellular telephones, may engage in two-way communications. Portions of the remote system 304 may be located indoors so as to provide one or more indoor coverage areas for the mobile units 306 when they are located indoors.

The local system 302 includes a base station 308, such as a cellular telephone macro base station, micro base station or pico base station. The base station 308 may be coupled to a communications network, such a public telephone network via a backhaul (not shown). Alternatively, the local system 302 may serve as a cellular repeater.

The local system 302 includes a transceiver 310 coupled to the base station 308. The transceiver 310 receives signals (i.e. downlink signals) from the base station 308 and transmits them in the form of a wireless analog signal via an antenna 312 to the remote system 304. The transceiver 310 also receives signals (i.e. uplink signals) from the remote system 304 and transmits them to the base station 308. To accomplish its functions, the transceiver 310 may include a frequency up-converter that converts a signal received from the base station 308 in a first frequency band (e.g., intermediate frequency or IF) to a second frequency band (e.g., radio frequency or RF) used by the antenna 312. The transceiver 310 may also include a frequency down-converter that converts a signal received from the remote system 304 in the second frequency band to the first frequency band used by the base station 308. The transceiver 310 may include amplifiers that amplify the up-link and down-link signals to suitable levels.

The remote system 304 includes an antenna 314 and transceiver 316 for communicating with the local system 302. The downlink signal received by the remote system 304 is passed to a converter 318A (FIG. 8) or 318B (FIG. 10) which converts the content of the analog signal received from the local system 302 to digital packets. In a preferred embodiment, the digital packets are Internet Protocol (IP) packets. The digital packets are then distributed via a network (e.g., a local area network or LAN) 320 to one or more converters 322A (FIG. 9) or 322B (FIG. 11). Each packet may be broadcast to all converters 322A or 322B or addressed to an appropriate one of the converters 322A or 322B. The converters 322A or 322B convert the digital packets received from the network 320 to analog signals which are then transmitted via one or more antennas 324 to the mobile units 306. The analog downlink signal transmitted by each antenna 324 is preferably a regenerated version of the signal received by the remote system 304 from the local system in that it has the same frequency components and content. For example, assuming the antenna 314 receives a signal in a particular channel in the 1900 MHz frequency band using CDMA protocol, the signals transmitted by the antennas 324 are also CDMA signals on the same frequency band and channel. Similarly, uplink signal provided to the base station 308 of the local system 302 preferably includes a regenerated version of the signal generated by each of the mobile units 306 in that it has the same frequency components and content. These signals also have some delay introduced by converting the analog signal to digital packets, transmitting them via the network 320 and then converting the digital packets back to analog. When an Ethernet network is used for the network 320 the delay can be as low as a few hundred microseconds.

The antennas 312 and 314 are preferably located outdoors so as to minimize signal attenuation between the local system 302 and the remote system 304. However, the other elements of the remote system 304, and particularly the antennas 324, are preferably located indoors so as to provide one or more indoor coverage areas for the mobile units 306. Each antenna 324 provides a corresponding coverage area for mobile units 306 that are located within range of the antenna 324.

By employing the network 310 to communicate the uplink and downlink signals in digital packets, the converters 322A and 322B (and, therefore, the antennas 324) can be located a distance from each other and from the converter 318A or 318B. This allows the remote system 304 to provide indoor coverage areas throughout the interior of structures of a variety of sizes and configurations, such as an office building, a campus of buildings, a convention center, an airport, etc. For example, assuming the network 320 operates in accordance with 10BASE-T, 100 BASE-T or gigabit Ethernet, this distance can be as much as 100 meters or more (since each twisted pair network segment can be 100 meters long and the LAN may perform signal regeneration between segments). Other network protocols may be employed, such as 10 gigabit Ethernet. While two converters 322A or 322B and antennas 324 are shown, it will be apparent that additional converters 322A or 322B and antennas 324 may be used so as to provide larger or additional coverage areas.

Figure 8:
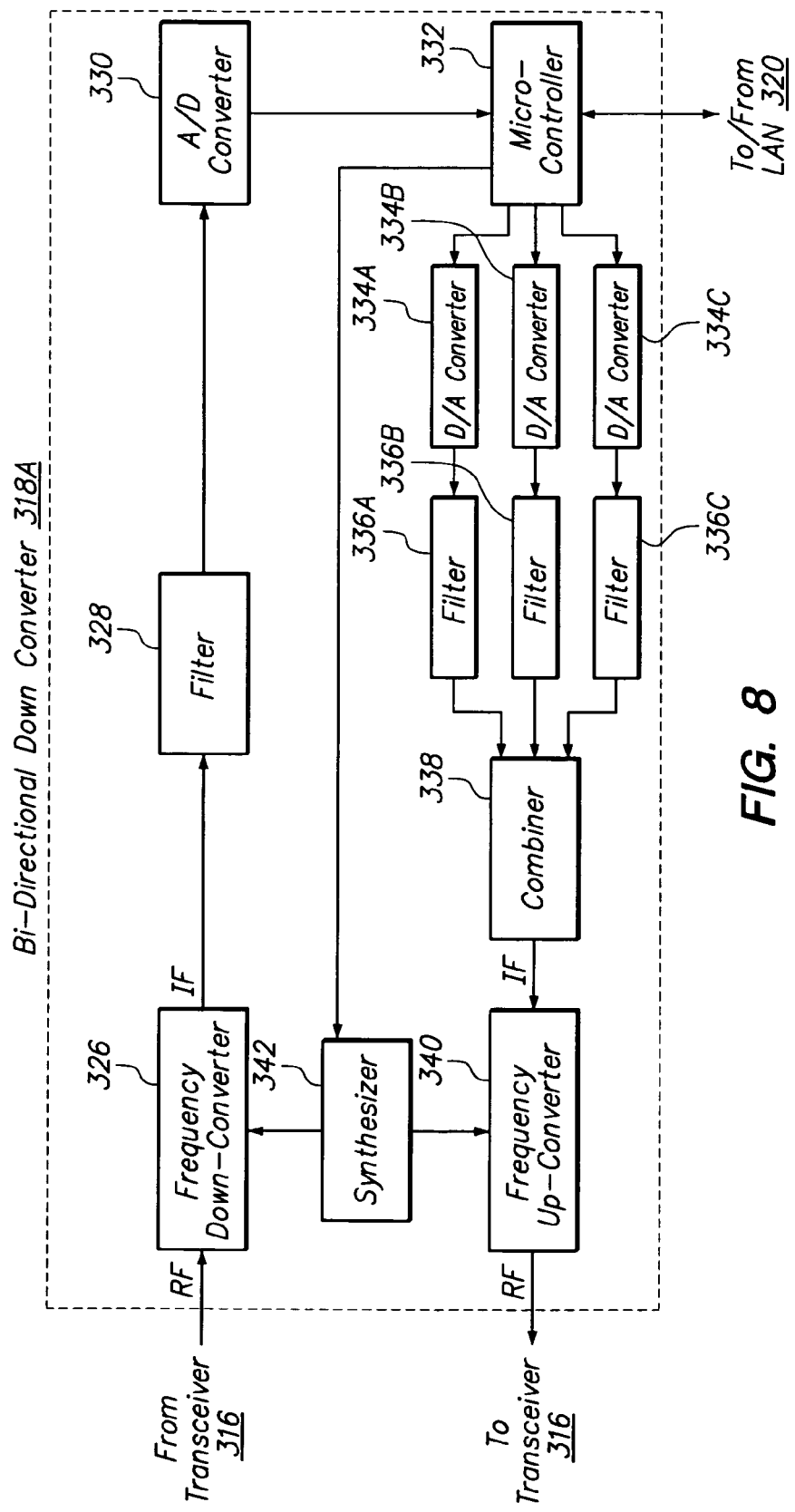
FIG. 8 illustrates a bi-directional analog signal to digital packet down converter for wireless two-way communications in accordance with an embodiment of the present invention.

FIG. 8 illustrates details of the bi-directional analog signal to digital packet converter 318A (shown in FIG. 7) for wireless two-way communications in accordance with an embodiment of the present invention. As shown in FIG. 8, for the converter 318A, the downlink signal from the local system 302 is received via the transceiver 316 (FIG. 7) and passed to a frequency down-converter 326. The frequency down-converter 326 converts the received signal, which may be an RF signal, to a lower frequency, such as IF. The down-converted IF signal may then be passed to a filter 328 which removes out-of-band frequency components (which may include upper and lower frequencies) in preparation for digital sampling of the analog signal. The signal is then passed to an analog-to-digital converter 330 which performs digital sampling of the signal. Each digital sample may have, for example, 8-14 bits of resolution.

The digital samples are then passed to a micro-controller 332 which buffers the samples and inserts them into the payload portions of properly formatted data packets (e.g., IP packets). For example, each packet payload may include two to eight digital samples. The micro-controller 332 then transmits the packets via the network 320 (FIG. 7).

The digital packets received by the converter 318A from the network 320 are passed to the micro-controller 332 which processes the packets to remove the digital samples contained in the payload portion of the packets. The digital samples are then passed to digital-to-analog signal converters 334A-C which convert the digital samples at a constant rate to analog signals. The analog signals are then filtered by filters 336A-C to remove out-of-band frequency components.

Because, the converter 318A may receive digital packets via the network 320 from multiple of the converters 322A (FIG. 7), multiple digital to analog converters 334A-C and filters 336A-C may be employed, one for each data stream from converters 322A. Alternatively, a single digital to analog converter and filter may each be provided with multiple parallel paths or a single path may be time-multiplexed to process the data streams from each converter 322A. The time-multiplexed analog signals or parallel analog signals may then be combined by combiner 338. For example, the signals from the different converters 322A may originate from different mobile units 306 (FIG. 7) operating in different channels or time-slots. Timeslots with no traffic will tend to have low field strength. Therefore, combining the signals may be performed by signal addition. While three paths through converters 334A-C and filters 336A-C are shown in FIG. 7, it will be apparent that more or fewer paths may be present. In a preferred embodiment, eighth paths are provided for servicing eight converters 322A.

The analog signal from the combiner 338 may be an IF signal. This analog signal may be passed to a frequency up-converter 340 which converts the IF signal to a frequency suitable for transmission to the local system 302 via the antenna 314 (FIG. 7). Prior to transmission, the signal may also be amplified to a suitable level.

A synthesizer 342 may be included in the converter 318A for generating a constant frequency signal used by the frequency down converter 326 and by the frequency up-converter 340. The synthesizer 342 may be controlled by the micro-controller 332 to select the output frequency of the synthesizer 342. This allows the converter 318A to perform its functions for various different frequency bands.

Figure 9:
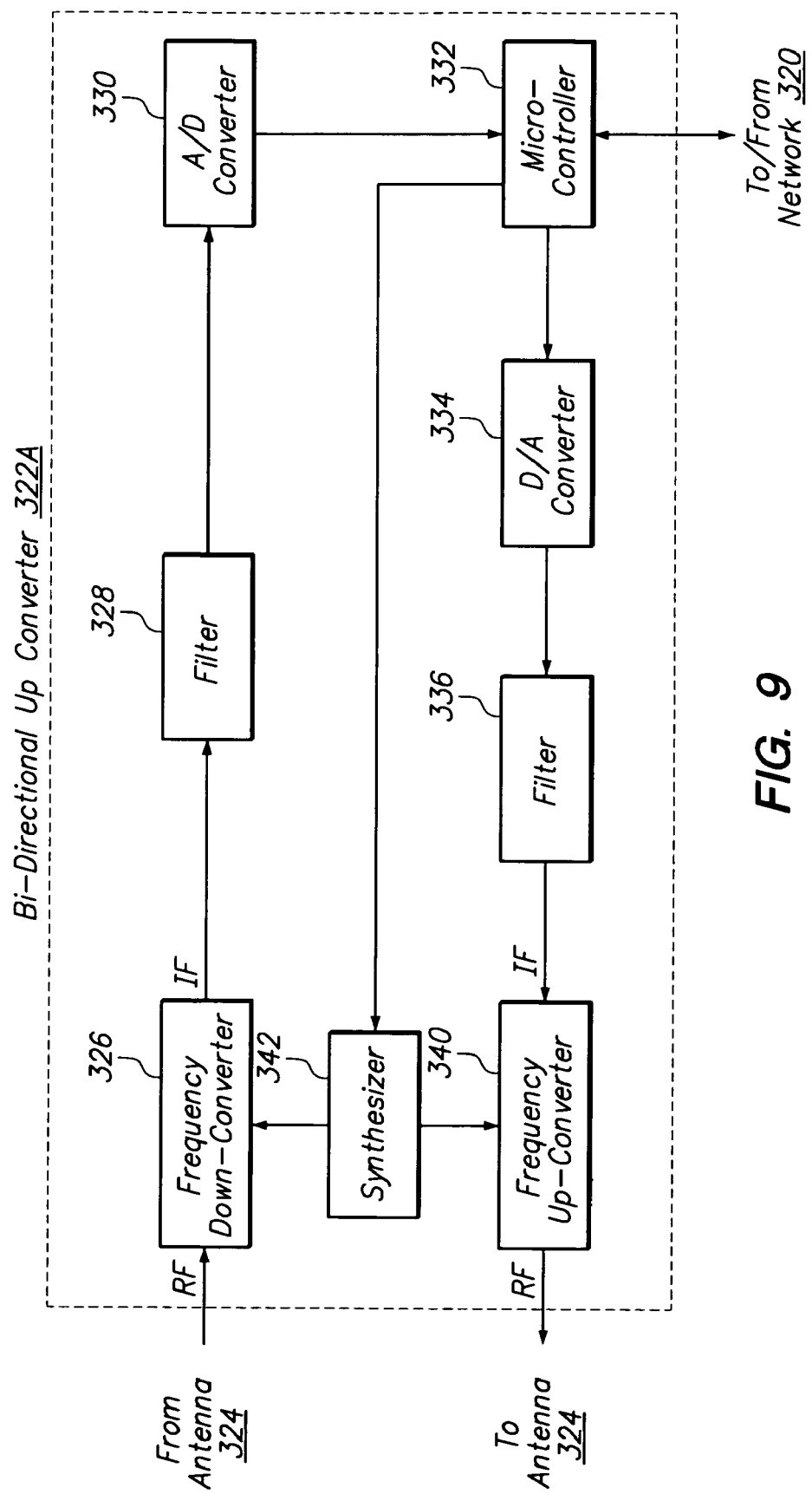
FIG. 9 illustrates a bi-directional analog signal to digital packet up converter for wireless two-way communications in accordance with an embodiment of the present invention.

FIG. 9 illustrates details of the digital packet to analog signal up converters 322A (shown in FIG. 7) in accordance with an embodiment of the present invention. The converters 332A can be identical to the converter 318A shown in FIG. 8 except that the combiner 338 of FIG. 8 can be omitted and the multiple parallel paths through digital to analog converters 334A-C and filters 336A-C can be replaced with a single path. Accordingly, for the downlink, the converter 322A receives digital packets from the network 320, removes digital samples from their payloads at micro-controller 332, converts to digital samples to analog (e.g., at IF) at digital to analog converter 334, filters the analog signal at filter 336 and up converts the analog signal to a frequency (e.g. RF) suitable for transmission via antenna 324 at frequency up-converter 340. For the uplink, the converter 322A receives an analog signal from antenna 324 and down-converts the signal (e.g. to IF) at frequency down-converter 326, filters the signal at filter 328, digitally samples the signal at analog to digital converter 330 and formats the digital samples into data packets for transmission via the network 320 at micro-controller 332. The converter 322A may include synthesizer 342 for generating a constant frequency signal used by the frequency down converter 326 and by the frequency up-converter 340.

Figure 10:
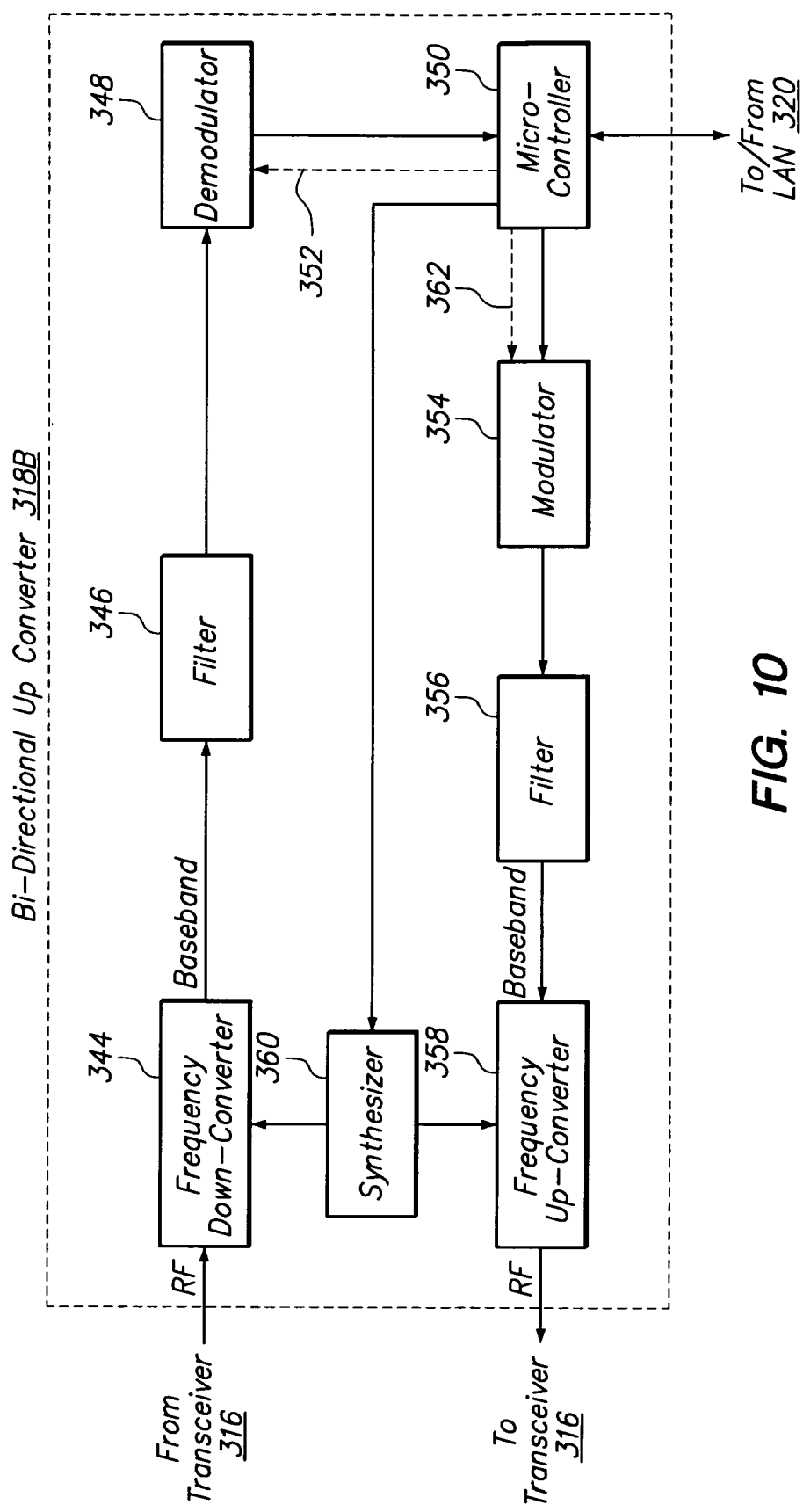
FIG. 10 illustrates a bi-directional analog signal to digital packet down converter for wireless two-way communications in accordance with an embodiment of the present invention.
Figure 11:
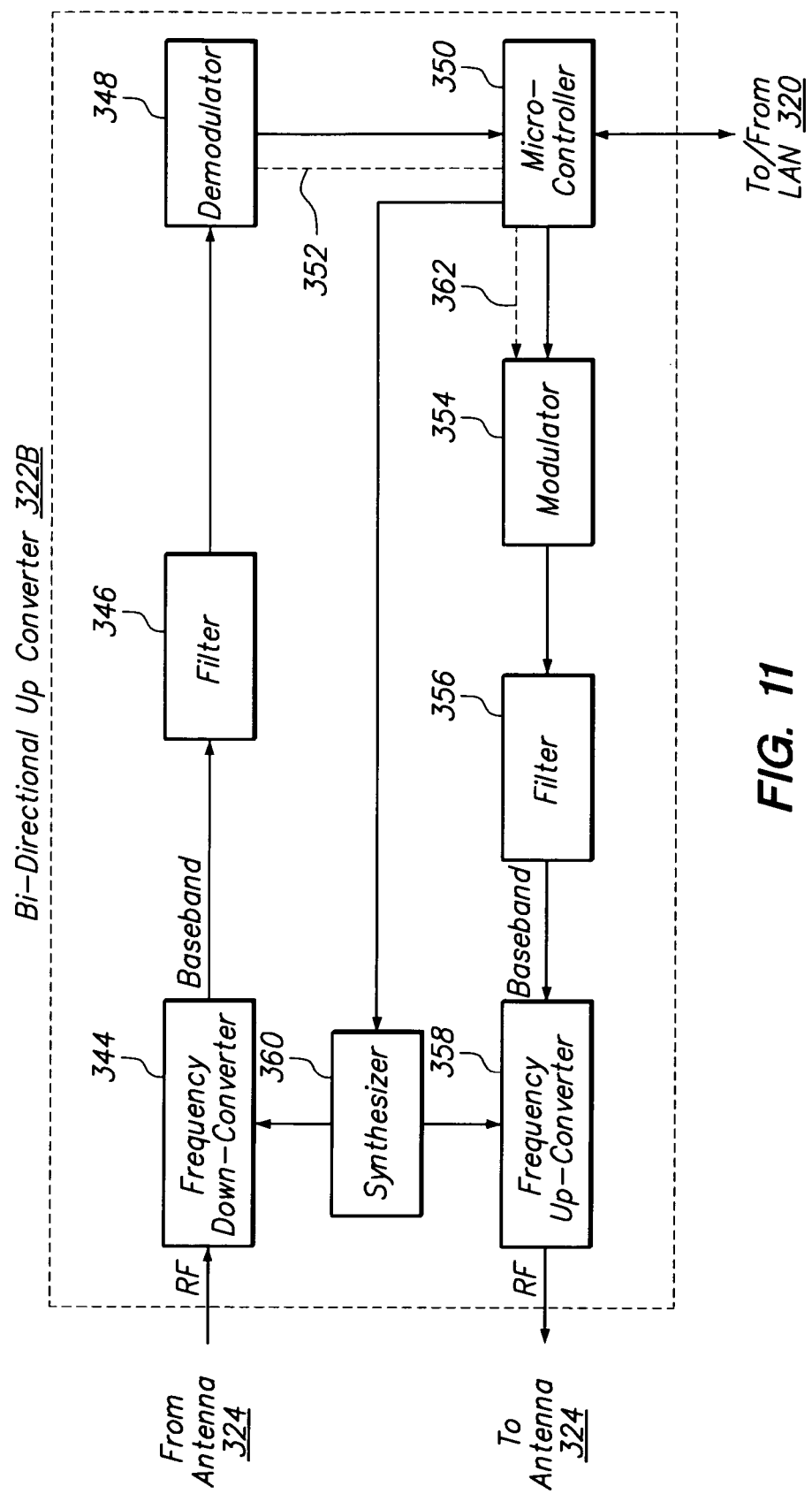
FIG. 11 illustrates a bi-directional analog signal to digital packet up converter for wireless two-way communications in accordance with an embodiment of the present invention.

FIG. 10 illustrates details of the analog signal to digital packet down converter 318B (shown in FIG. 7) in accordance with an embodiment of the present invention. The converter 318B differs from the converter 318A (FIG. 8) in that it performs processing at baseband rather than IF. The downlink signal from the local system 302 (FIG. 7) is passed to a frequency down-converter 344 which converts the received signal, which may be an RF signal, to baseband. The baseband signal may then be passed to a filter 346 which removes out-of-band frequency components in preparation for demodulation of the analog signal. The signal is then passed to a demodulator 348 which performs demodulation of the filtered baseband signal by converting the baseband signal to digital message symbols. A micro-controller 350 buffers the symbols and inserts them into the payload portions of properly formatted data packets (e.g., IP packets). The micro-controller 350 then transmits the packets to converters 322B (FIGS. 7 and 11) via the network 320 (FIG. 7).

The signal received by the down converter 318B may be modulated according to a variety of different modulations schemes, such as QPSK, 16 QAM or 64 QAM. In an embodiment, the demodulator 348 is configured to the highest inclusive modulation scheme among the possible modulation schemes of the received signal. In addition, or alternatively, so that the demodulator 348 is configured for the correct one of these modulation schemes for a particular received signal, the converter 318B may optionally include a control path 352 which allows the micro-controller 350 to configure the demodulator 348 according to a particular modulation scheme.

For the uplink, the digital packets received from the network 320 are processed by the micro-controller 350 to remove the message symbols contained in the payload portion of the packets. The symbols are then passed to a modulator 354 which converts the symbols at a constant rate to an appropriately encoded analog baseband signal. The analog baseband signal may then be passed to a filter 356 which performs smoothing on the signal by removing undesired frequencies.

The analog signal may then be passed to a frequency up-converter 358 which converts the baseband signal to a frequency suitable for transmission to the local system 302 via transceiver 316. As mentioned, this signal may be transmitted at RF and preferably in the same frequency band as the signal received from the local system 302.

A synthesizer 360 may be included in the converter 318B for generating a constant frequency signal used by the frequency down converter 34 and the frequency up converter 358.

So that the modulator 354 is configured for the correct one of several possible modulation schemes for a particular received signal, the converter 318B may optionally include a control path 362 which allows the micro-controller 350 to configure the modulator 354 according to a particular modulation scheme. For this purpose, the micro-controller 350 is preferably able to determine the modulation scheme of the signal received from the local system 302 (FIG. 7). The micro-controller 350 may, for example, determine the modulation scheme from the number of bits per symbol received from the demodulator 348.

Similarly to the converter 318A (FIG. 8), the converter 318B may receive digital packets via the network 320 from multiple of the converters 322B (FIG. 7). However, because the signals are at baseband, the signals are combined differently. For example, the combiner 338 used by the converter 318A (FIG. 8) may be omitted. Instead, the message symbols may be placed into the data packets by converters 322B along with information indicating "confidence" of the symbols. For example, the converters 322B may measure received signal strength as an indicator of confidence in the symbols decoded from the signal. Rather than, or in addition to, signal strength, measures of jitter and/or phase error could be used to indicate confidence. A confidence value may be transmitted for each symbol or for groups of multiple symbols. For example, a single confidence value may be transmitted with each packet where each packet contains multiple symbols. The micro-controller 350 then combines the symbols from the multiple converters 322B using the confidence information. For example, the micro-controller may weight the symbols according to confidence, or the micro-controller 350 may use majority voting or the micro-controller may ignore all but the symbols with the highest confidence (e.g. symbols from the strongest signal) or may ignore those that fall below a predetermined threshold. Signals representing noise will then tend to be canceled or ignored while active transmissions will tend to be retained. The combined result is a stream of symbols which is then passed to the modulator 354 as described above.

FIG. 11 illustrates details of the analog signal to digital packet up converter 322B (shown in FIG. 7) in accordance with an embodiment of the present invention. As shown in FIGS. 7 and 11, the converter 322B communicates analog signals to and from antennas 324 and communicates digital packets to and from the network 320. The converter 322B may be identical to the converter 318B in many respects. Accordingly, the converter 322B is shown in FIG. 11 with like reference numerals to represent like elements of the converter 318B. A primary difference between the converter 322B and the converter 318B is that the converter 322B preferably encodes the uplink data packets with confidence information regarding the symbols whereas the converter 318B uses this confidence information to combine the signals received from multiple converters 322B, as described above. To perform its function of encoding the uplink data packets with confidence information, the demodulator 348 of the converter 322B preferably generates the confidence information for symbols it decodes from the analog baseband signal and passes this confidence information to the micro-controller 350 along with the symbols. The micro-controller 350 of the converter 322B then inserts the confidence information into the data packets for transmission to the converter 318B.

Figure 12:
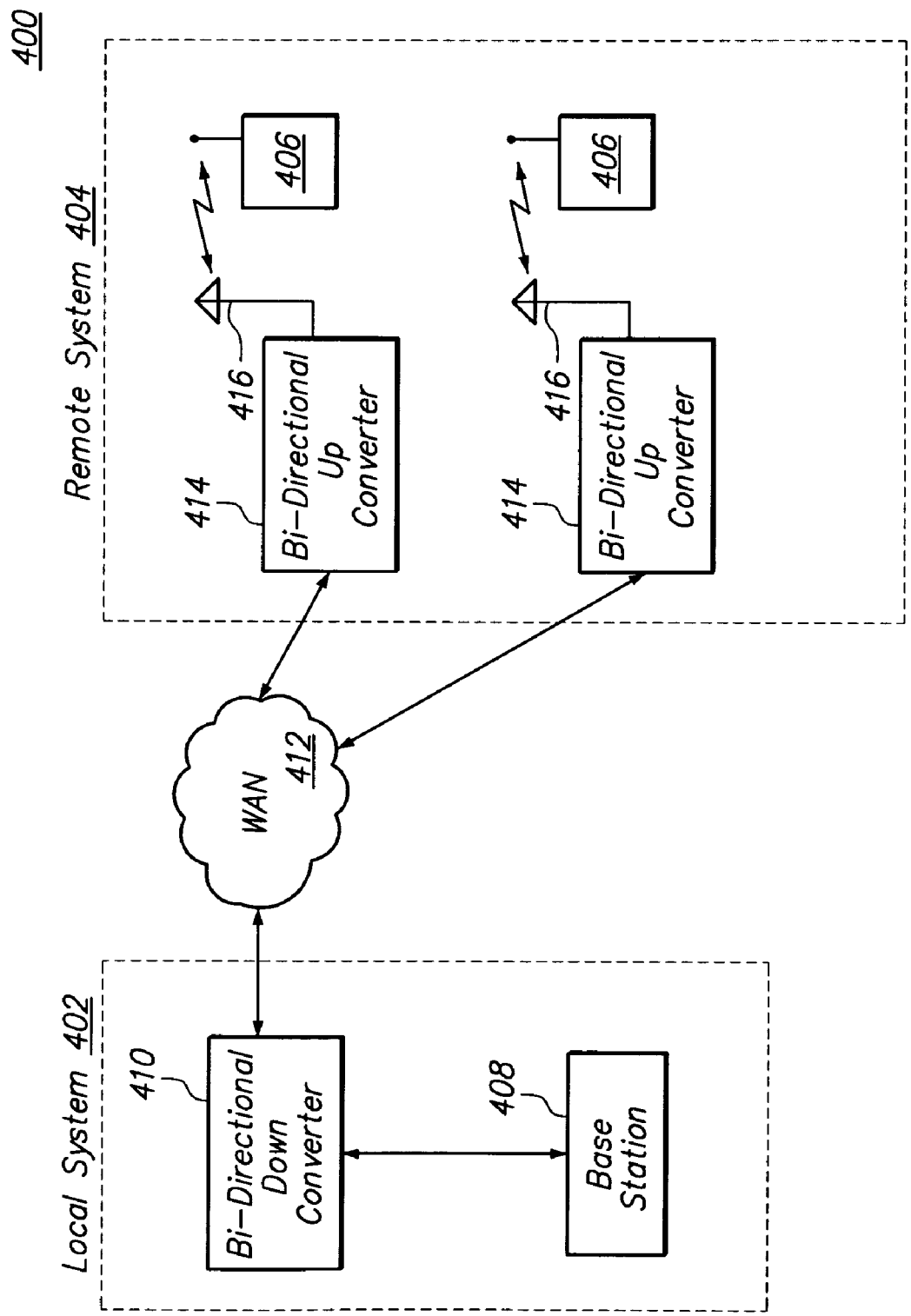
FIG. 12 illustrates an alternative embodiment of a system for providing a remote coverage area for wireless two-way communications in accordance with an embodiment of the present invention.

FIG. 12 illustrates an alternative embodiment of a system 400 for providing a remote coverage area for wireless two-way communications in accordance with an embodiment of the present invention. The system 400 is configured similarly to the system 200 shown in FIG. 4, except that the system 400 provides for two-way communications.

The system 400 includes a first (local) system 402 and a second (remote) system 404. The local system 402 is local to the premises of a two-way communication service provider, such as a cellular telephone service provider. The remote system 404 is preferably geographically remote from the local system 402. The remote system 404 provides one or more remote coverage areas in which mobile units 406, such as cellular telephones, may engage in two-way communications. Portions of the remote system 404 may be located indoors so as to provide one or more indoor coverage areas for the mobile units 406 when they are located indoors.

The local system 402 includes a base station 408, such as a cellular telephone macro base station, micro base station or pico base station. The base station 408 may be coupled to a communications network, such a public telephone network via a backhaul (not shown). Alternatively, the local system 402 may serve as a cellular repeater.

The local system 402 includes an analog signal to digital packet down converter 410 coupled to the base station 408. The converter 410 receives the content from the base station 408, converts the content to digital packets and transmits the content to the remote system 404. The converter 410 may be identical to the converter 318A or 318B shown in FIGS. 8 and 10. Thus, for processing the down-link signal, the converter 410 down-converts the signal from the local system 402 to IF and processes the signal as described above in connection with the converter 318A. Alternatively, the converter 410 down-converts the signal from the local system 402 to baseband and processes the signal as described above in connection with the converter 318B. The packets generated by the converter 410 are communicated to the remote system 404 via a network (e.g., a wide area network or WAN) 412, such as the Internet.

For the uplink signal, the converter 410 receives data packets from the remote system 404 via the network 412 and processes them as described in connection with the converters 318A or 318B. These uplink data packets may include multiple data streams originated by multiple converters 414 (FIG. 12).

The remote system 404 includes one or more converters 414 that convert the digital packets received from the network 412 to analog signals which are then transmitted via antennas 414 to the mobile units 406. The converters 414 may be identical to the converter 322A or 322B shown in FIGS. 9 and 11. Thus, for the down-link signal, the converter 414 receives data packets via the network 412. Each packet may be broadcast to all converters 414 or addressed to an appropriate one of the converters 414 The down-link packets received by the converters 414 from the network 412 are processed as described above in connection with the converters 322A and 322B. Similarly, for processing the up-link signal from the mobile units 406, the converters 414 may convert the up-link signals into packets as described above in connection with the converters 322A and 322B. The packets generated by the converter 414 are communicated to the local system 402 via the network 412.

The downlink analog signal transmitted by each antenna 416 is preferably a regenerated version of the signal generated by the base station 408 of the local system 402 in that it has the same channel, frequency, modulation and formatting characteristics. Similarly, uplink signal provided to the base station 408 of the local system 402 preferably includes a regenerated version of the signal generated by each of the mobile units 406 in that it has the same channel, frequency, modulation and formatting characteristics. These regenerated signals also have some delay introduced by converting the analog signal to digital packets, transmitting them via the network 412 and then converting the digital packets back to analog. When the signal is routed through the Internet (used for the network 412), the delay of the signal is can reach tens or even hundreds of milliseconds. If dedicated communication links are used for the network 412 rather than the Internet, the delay can be reduced to a few milliseconds depending upon the distance and configuration of the network 412 (e.g., the number of routers/switches traversed by the packets as they travel between the local system 402 and the remote system 404).

Many of the elements of the remote system 404, and particularly the antennas 416, are preferably located indoors so as to provide indoor coverage areas for the mobile units 406. Each antenna 416 provides a corresponding coverage area for mobile units 406 that are located within range of the antenna 416.

By employing the network 412 to transmit the broadcast content in digital packets, the converters 414 (and, therefore, the antennas 416) can be located essentially anywhere in which they can be coupled to the network 412. For example, where the Internet is employed for the network 412, the converters 414 and antennas 416 can be located tens or hundreds of miles away from the local system 402. The configuration of the system 400 allows the remote system 404 to provide indoor coverage areas throughout the interior of structures of a variety of sizes and configurations, such as an office building, a campus of buildings, a convention center, an airport, etc. While two converters 414 and antennas 416 are shown, it will be apparent that additional converters 414 and 416 antennas may be used so as to provide larger or additional coverage areas.

In an exemplary embodiment, the base station 408 is a pico base station transmitting one GSM carrier at 200 kHz. For digitizing the IF signal at converter 414, at least 400k samples per second are needed to be taken. If the analog to digital converter of converter 414 takes 14-bit samples, the data stream without any overhead required for packetizing the data is 5.6 Mb/s. In case baseband is used, the bit rate required for GSM is 270 kb/s. Newer DSL broadband connections offer 25 Mb/s or more. Therefore, such DSL broadband connections may be sufficient enough to support one or more GSM carriers or even CDMA or UMTS carriers. Similarly, if the base station 308 of FIG. 7 transmits one GSM carrier at 200 kHz, conventional Ethernet LAN protocols should be sufficient to support one or more such carriers.

Because the transport over the networks 320 (FIG. 7) and 412 (FIG. 12) adds delay the base stations 308 (FIG. 7) and 408 (FIG. 12) have to be able to accept additional delay of several hundred microseconds or even milliseconds. Because most of the conventional two-way radio protocols can only handle delays of less than one millisecond, some modifications may be needed in the layer 1 software of the base stations 308 and 408.

Particularly, in an embodiment, the receiving window in which a response to an outgoing message is expected to be returned to the base station 308 or 408, is moved in time (i.e. offset) by an amount, t1, which is commensurate with the expected additional delay. This can be hundreds of microseconds to a few milliseconds depending upon the expected delay. In this configuration, the mobile units 306 (FIG. 7) and 406 (FIG. 12) always experience a minimum delay of t1, even if the mobile is next to the antenna 324 (FIG. 7) or 416 (FIG.

12) of the remote system. Moving the receiving window is not expected to interference with other mobile stations of adjacent timeslots, since t1 is added to all signals. As long as the delay spread does not exceed the expected delay, t1, of the network, no degradation of the capacity is expected to occur.

The delay, t1, is dependent on a number of factors including the protocol and configuration of the network 320 (FIG. 7) or 412 (FIG. 12) and number and type of routers and/or switches used. In case the network 320 or 412 is a separate network where the traffic is controlled and local, e.g. within a building, the delay can be as low as a hundred microseconds and can be deterministic. However, if the network 320 or 412 is the public Internet and the distance is not local, a delay of more than 100 ms can be observed.

If the delay is more than a few milliseconds, most of the mobile radio protocols would need some modifications allowing mobile units 306, 406 and base stations 308, 408 to react later due to the delay. For example, a mobile unit is required to response in GSM within three timeslots of 4.6 ms each; this means if the delay is 10 ms (one way), the mobile unit would receive the message 10 ms later, then process it and reply 3*4.6 ms later with an answer. The base station would receive this signal with 10 ms delay and therefore 20 ms total delay (roundtrip delay). In this case, the window is moved by 20 ms (t1) so that the radio communication protocols still function properly. To move the window, some timers in the radio protocol layer at the base station 308 and 408 and mobile units 306 and 406 may need to be adjusted. If the delay, t1, is increased to the point that not only the base stations 308 or 408 is affected but also their base station controller (BSC) is affected, modification to the protocol and timers in the base station controller may be needed.

The limit of the timing window is when timers in the base station or mobile will run out of limits. For example, when the mobile sends an access burst it waits until this burst is referenced by the base station. This is done by a relative time reference. If the minimum delay of the system would be 100 ms; the timer in the mobile station would expire first before the base station would have a chance to process it since the timer is not designed to be so long.

As explained above, the receiving window is offset by an amount, t1. Alternatively, or in addition to an offset, the size of the receiving winder may be increased so as to cover a larger delay and so as to cover varying delays.

The above-described systems and methods can be used for all standard mobile technologies, like GSM, CDMA, UMTS and WiMax and broadcast technologies in Mobile TV like MediaFlo, DVB-H and ISDB-T as well as satellite radio (e.g. Sirius and XM).

In broadcast networks, such as Mobile TV and satellite radio, this delay is typically not a big issue, since there is no uplink. Therefore, the mobile receivers 106 (FIG. 1) and 206 (FIG. 6) at the remote systems 104 (FIG. 1) and 204 (FIG. 6) will receive the satellite or TV signal a couple milliseconds later. There would be no need for a protocol change to accommodate any round-trip delay.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A system for providing a remote coverage area for wireless communications, comprising:
 a local system that generates a first radio communication signal; and
 a remote system located geographically remote from the local system, the remote system comprising:
  a first converter that converts the first radio communication signal to a stream of data packets;
  a network that receives the stream of data packets from the first converter; and
  a second converter that receives the stream of data packets from the network and generates the remote coverage area by converting the stream of data packets to a second radio communication signal;
 wherein the second radio communication signal is a regenerated version of the first radio communication signal having the same frequency and content.

2. The system according to claim 1, wherein the remote coverage area is indoors.

3. The system according to claim 1, further comprising one or more additional converters at the remote system, wherein each of the one or more additional converters receives the stream of data packets from the network and generates a corresponding remote coverage area.

4. The system according to claim 3, wherein the first radio communication signal is a down-link communication signal and wherein the system supports uplink communication from each remote coverage area to the local system.

5. The system according to claim 1, wherein the first radio communication signal is a broadcast signal.

6. The system according to claim 1, wherein the first radio communication signal is a broadcast television signal.

7. The system according to claim 1, wherein the first radio communication signal is a satellite radio signal.

8. The system according to claim 1, wherein the first radio communication signal is a down-link communication signal and wherein the system supports uplink communication from the remote coverage area to the local system.

9. The system according to claim 8, wherein the local system comprises a cellular telephone base station.

10. The system according to claim 8, wherein the local system comprises a cellular telephone repeater.

11. The system according to claim 1, wherein the second converter receives a third radio communication signal from a mobile unit and converts the third radio communication signal into a second stream of data packets, the network receives the second stream of data packets from the second converter and the first converter converts the stream of data packets into a fourth radio communication signal.

12. The system according to claim 11, wherein the fourth radio communication signal is a regenerated version of the second radio communication signal having the same frequency and content.

13. The system according to claim 1, wherein the network comprises an Ethernet LAN.

14. The system according to claim 1, wherein the first radio communication signal is down-converted by the first converter to an IF signal and the IF signal is digitally sampled to form the stream of data packets.

15. The system according to claim 1, wherein the first radio communication signal is down-converted by the first converter to a baseband signal and the baseband signal is demodulated to form the stream of data packets.

16. The system according to claim 15, wherein the first converter is configured to demodulate the first radio communication signal in any of a plurality of modulation schemes.

17. The system according to claim 16, wherein the first converter is configured to demodulate the first radio communication signal in a highest inclusive one of the plurality of modulation schemes.

18. A system for providing a remote coverage area for wireless communications, comprising:
- a local system comprising a base station that generates a first analog communication signal and a first converter that converts the first analog communication signal to a stream of data packets;
- a network that receives the stream of data packets from the local system; and
- a remote system located geographically remote from the local system, the remote system comprising a second converter that receives the stream of data packets from the network and generates the remote coverage area by converting the stream of data packets to a second analog communication signal;
- wherein the second radio communication signal is a regenerated version of the first radio communication signal having the same frequency and content.

19. The system according to claim 18, wherein the remote coverage area is indoors.

20. The system according to claim 18, further comprising one or more additional converters at the remote system, wherein each of the one or more additional converters receives the stream of data packets from the network and generates a corresponding remote coverage area.

21. The system according to claim 20, wherein the first radio communication signal is a down-link communication signal and wherein the system supports uplink communication from each remote coverage area to the local system.

22. The system according to claim 18, wherein the first radio communication signal is a broadcast signal.

23. The system according to claim 18, wherein the network comprises a wide area network.

24. The system according to claim 23, wherein the wide area network comprises the Internet.

25. A method of providing a remote coverage area for wireless communications, comprising:
- generating a first radio communication signal at a first location;
- converting the first radio communication signal to a stream of data packets at a second location that is geographically remote from the first location;
- communicating the stream of data packets via a network;
- receiving the stream of data packets from the network; and
- converting the stream of data packets to a second radio communication signal to generate the remote coverage area;
- wherein the second radio communication signal is a regenerated version of the first radio communication signal having the same frequency and content.

26. A method of providing a remote coverage area for wireless communications, comprising:
- generating a first analog communication signal;
- converting the first analog communication signal to a stream of data packets at a first location;
- communicating the stream of data packets via a network to a second location that is geographically remote from the first location;
- receiving the stream of data packets from the network; and
- converting the stream of data packets to a second analog communication signal to generate the remote coverage area;
- wherein the second radio communication signal is a regenerated version of the first radio communication signal having the same frequency and content.

* * * * *